(12) United States Patent
Wilhelmsson et al.

(10) Patent No.: US 10,924,207 B2
(45) Date of Patent: Feb. 16, 2021

(54) TECHNIQUE FOR RADIO TRANSMISSION UNDER VARYING CHANNEL CONDITIONS

(71) Applicant: Telefonaktiebolaget LM Ericsson (publ), Stockholm (SE)

(72) Inventors: Leif Wilhelmsson, Dalby (SE); Rocco Di Taranto, Lund (SE); Miguel Lopez, Solna (SE); Roland Smith, Nepean (CA)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 319 days.

(21) Appl. No.: 15/781,372

(22) PCT Filed: Apr. 4, 2018

(86) PCT No.: PCT/EP2018/058570
§ 371 (c)(1),
(2) Date: Jun. 4, 2018

(87) PCT Pub. No.: WO2019/192684
PCT Pub. Date: Oct. 10, 2019

(65) Prior Publication Data
US 2020/0274640 A1   Aug. 27, 2020

(51) Int. Cl.
*H04L 1/00* (2006.01)
*H04L 27/34* (2006.01)
(Continued)

(52) U.S. Cl.
CPC .......... *H04L 1/0035* (2013.01); *H04L 1/0003* (2013.01); *H04L 1/0009* (2013.01);
(Continued)

(58) Field of Classification Search
CPC ... H04L 1/0035; H04L 1/0003; H04L 1/0009; H04L 1/0026; H04L 1/1864;
(Continued)

(56) References Cited

U.S. PATENT DOCUMENTS 7,043,210 B2    5/2006  Zhu et al.
2006/0022747 A1*  2/2006  Chen .................... H03F 3/58
                                                        330/42
(Continued)

FOREIGN PATENT DOCUMENTS

EP         1011245 A1   6/2000
WO   WO 2015/032440 A1   3/2015

OTHER PUBLICATIONS

Second Written Opinion of the International Searching Authority, PCT/EP2018/058570, dated Feb. 20, 2020, 11 pages.
(Continued)

*Primary Examiner* — Ted M Wang
(74) *Attorney, Agent, or Firm* — Sage Patent Group

(57) ABSTRACT

A technique for radio transmitting data is described. As to a method aspect of the technique data to be transmitted to a receiver is represented by at least two partial modulation symbols. Each of the at least two partial modulation symbols is associated to a different layer of the radio transmission to the receiver. A modulation symbol is generated by combining the at least two partial modulation symbols at different power levels according to the associated layer. The modulation symbol is transmitted to the receiver.

9 Claims, 14 Drawing Sheets

(51) Int. Cl.
*H04W 52/42* (2009.01)
*H04L 1/18* (2006.01)
*H04L 27/36* (2006.01)

(52) U.S. Cl.
CPC .......... *H04L 1/0026* (2013.01); *H04L 1/1864* (2013.01); *H04L 1/1896* (2013.01); *H04L 27/3488* (2013.01); *H04L 27/362* (2013.01); *H04W 52/42* (2013.01)

(58) Field of Classification Search
CPC . H04L 1/1896; H04L 27/3488; H04L 27/362; H04L 52/42; H04W 52/42
USPC ......................................................... 375/264
See application file for complete search history.

(56) References Cited

U.S. PATENT DOCUMENTS

2007/0195907 A1 8/2007 Wang et al.
2007/0297533 A1* 12/2007 Chitrapu ............. H04L 27/3488
375/308

2016/0309542 A1 10/2016 Kowalski et al.

OTHER PUBLICATIONS

M. J. Hossain, P. K. Vitthaladevuni, M.-. Alouini, V. K. Bhargava and A. J. Goldsmith, "Adaptive hierarchical modulation for simultaneous voice and multiclass data transmission over fading channels," in IEEE Transactions on Vehicular Technology, vol. 55, No. 4, pp. 1181-1194, Jul. 2006.
Chari, M. R., et al., "FLO Physical Layer: An Overview," IEEE Transactions on Broadcasting, vol. 53, No. 1, Mar. 2007, XP011172013, pp. 145-160.
International Search Report and Written Opinion of the International Searching Authority, PCT/EP2018/058570, dated Jan. 7, 2019, 20 pages.
Mukhtar, H., et al., "An Adaptive Hierarchical QAM Scheme for Enhanced Bandwidth and Power Utilization," IEEE Transactions on Communications, vol. 60, No. 8, Aug. 2012, pp. 2275-2284.
Juang, R.T. et al., "Link Adaptation Based on Repetition Coding for Mobile Worldwide Interoperability for Microwave Access Systems," IET Communications, vol. 4, Issue 9, Jun. 7, 2010, pp. 1039-1048.

* cited by examiner

1100

1200

TECHNIQUE FOR RADIO TRANSMISSION UNDER VARYING CHANNEL CONDITIONS

CROSS REFERENCE TO RELATED APPLICATIONS

This application is a 35 U.S.C. § 371 national stage application of PCT International Application No. PCT/EP2018/058570 filed on Apr. 4, 2018, the disclosure and content of which is incorporated by reference herein in its entirety.

TECHNICAL FIELD

The present disclosure relates to a radio transmission technique. More specifically, and without limitation, methods and devices are provided for transmitting data to a receiver under varying channel conditions.

BACKGROUND

Digital radio communication, including some cellular radio access technologies (RATs), can use shared radio spectrum. An example for shared radio spectrum is includes unlicensed bands such as the 2.45 GHz bands (also referred to as industrial, scientific and medical radio bands or ISM bands) and the 5 GHz bands. Long Term Evolution (LTE) License-Assisted Access (LAA) according to the Third Generation Partnership Project (3GPP) is an example for a cellular RAT using at least partly unlicensed bands.

For coexistence on the shared radio spectrum, particularly between different radio devices using a certain RAT as well as between radio devices using different RATs, some coexistence mechanism is employed. A commonly used coexistence mechanism is carrier sense multiple access with collision avoidance (CSMA/CA), which is based on a listen before talk (LBT) process. Effectively, a radio device that intends to make use of the shared radio spectrum for radio transmission senses a channel to be used and determines whether the channel is busy (i.e., in use or occupied) or idle (i.e., unused or unoccupied). If the channel is determined to be busy, the radio transmission is deferred, whereas a transmission is initiated if the channel is determined to be idle. Thus, CSMA/CA avoids certain collisions by initiating a transmission only when the channel is not already used.

Although this channel access mechanism limits the amount of collisions on the shared radio spectrum, it does not work very well in many situations. Specifically, the LBT process is performed by the radio device intending to initiate a transmission (briefly: transmitter), but the interference conditions at the radio device intended for the reception (briefly: receiver) may be largely unknown.

In order to indicate varying channel conditions at the receiver to the transmitter, various implementations of a channel feedback from the receiver are known. For example, link performance may be optimized according to the standard family IEEE 802.11 (Wi-Fi) by adjusting the modulation and coding scheme (MCS) for the data transmissions based on error statistics of previously transmitted data packets with the aim to select an MCS that achieves a sufficiently low error probability and, at the same time, provides a data rate that is as high as possible. This is an example of link adaptation (LA), which commonly relies on an implicit feedback such as positive acknowledgment (ACK) or negative acknowledgment (NACK) for Automatic Repeat reQuest (ARQ), as the receiver does not provide explicit information about the channel condition it is experiencing. As an alternative example, which is often used in cellular RATs according to 3GPP, the receiver provides explicit feedback. The explicit feedback may comprise information about the interference level or an explicit suggestion for a suitable MCS to use. However, irrespectively of whether the feedback is implicit or explicit, to be useful it must allow for prediction of the channel conditions for an upcoming transmission. If the channel conditions vary fast, e.g. based on highly varying interference conditions, any channel feedback regarding the previous transmission may be essentially useless.

L. Wilhelmsson and J. Persson describe in the document WO 2015/032440 an explicit indication of the reason for a negative acknowledgment feedback (NACK) to address shortcomings of current channel feedback schemes. The reason for a decoding failure is explicitly sent to the transmitter, e.g. whether the failure was primarily due to noise or interference. This allows the transmitter to better predict the receiver conditions. However, even if a more suitable MCS can be selected in this way, the selection is still based on long term statistics rather than the instantaneous channel conditions.

An existing technique that is effective under varying channel conditions is a hybrid ARQ (HARQ) transmission with incremental redundancy retransmissions. When the receiver conditions are poor, at least some information can be extracted at the receiver side, and then a retransmission can be requested as long as the packet has not been successfully decoded. A drawback of HARQ transmission is an increased complexity, both in terms of decoding and in terms of memory requirements at the receiver. Yet another drawback is increased latency, especially if more than one retransmission is needed, and potentially even more of a problem if the transmitter needs to contend for the channel in order to be allowed to transmit on the shared spectrum.

For example, vehicular radio communication using direct sidelinks or base station connectivity can actively avoid accidents and improve traffic efficiency if latency is low under rapidly varying channel conditions.

SUMMARY

Accordingly, there is a need for a radio communication technique that reduces latency, increases reliability and/or increases throughput under varying channel conditions. Alternatively, or in addition, there is a need for a radio communication technique that avoids or mitigates the problem caused by that the interference level at a receiver is very hard to estimate based on the experienced interference level at the transmitter.

As to a first method aspect, a method of radio transmitting data is provided. The method may comprise or initiate a step of representing data to be transmitted to a receiver by at least two partial modulation symbols. Each of the at least two partial modulation symbols may be associated to a different layer of the radio transmission to the receiver. The method may further comprise or initiate a step of generating a modulation symbol by combining the at least two partial modulation symbols at different power levels according to the associated layer. The method may further comprise or initiate a step of transmitting the modulation symbol to the receiver.

The technique may be implemented as a method of a radio transmitting data packets, e.g. when a current channel condition and/or a current receiver condition (collectively:

conditions) are unknown at the transmitter. The conditions may be unknown in the step of transmitting and/or when formatting the data packet.

Herein, the expression "level" may refer to power on a logarithmic scale, e.g., in relative units such as decibel (dB) or absolute units such as dBm (i.e., dB relative to 1 milliwatt).

The technique may be implemented using a hierarchical modulation in the step of generating the modulation symbol. For example, referring to the different layers by an integer index, e.g., i=0, 1, . . . , n−1 or 1, 2, . . . , n, the power associated to the respective layers may correspond to a decreasing exponential function of the index, e.g., the power may be proportional to $\exp(-i \cdot c)$ or $2^{-(i \cdot c')}$ with some constant c or c'. In other words, referring to the different layers by the integer index, i, the power levels associated to the respective layers may correspond to a decreasing linear function of the index, e.g., the power level may be $-i \cdot C$ dB with some constant C, relative to the greatest power level. The constant C is an example for a transmission parameter (herein below briefly: parameter). By way of example, c=ln 4, c'=2 or C=6 dB.

The combining of the partial modulation symbols may apply suitable parameters such that the receiver is able to decode as many layers as the channel condition and/or the receiver condition allow.

At least in some embodiments and/or channel conditions, by virtue of the combined partial modulation symbols (e.g., the hierarchical modulation), the data transmission can be more robust in the presence of noise and/or interference, e.g., under rapidly fluctuating noise and/or interference.

Embodiments of the technique can enable a preemptive or feedback-less link adaptation for the radio transmission of the data to the receiver, e.g., for unicasting to a single receiver or multicasting the same data to several receivers. The different power levels may correspond to the different layers of the radio transmission to the receiver. Depending on the instant channel conditions at the receiver, more or less of the layers may be successfully receivable (e.g., decodable) at the receiver solely based on the modulation symbol, i.e., the combined partial modulation symbols.

The different partial modulation symbols may be combined at the different power levels according to the respective layer. Each layer may be associated with the corresponding power level. Combining the partial modulation symbols at different power levels may also be referred to as a hierarchical modulation.

The different layers may enable power-level division multiplexing of the data for the data transmission to the receiver. The layers may be referred to as layers of the hierarchical modulation. The power-level division multiplexing may be combined with at least one of time division multiplexing, frequency division multiplexing and spatial division multiplexing (e.g., using antenna division multiplexing, beamforming and/or MIMO channels).

Each of the partial modulation symbols may represent a part of the data to be transmitted to the receiver. Herein, the parts of the data corresponding to the respective layers and/or the parts of the data represented by the respective partial modulation symbols may also be briefly referred to as the parts of the data.

Preferably, each of the at least two parts of the data represented by a respective one of the at least two partial modulation symbols is to be transmitted to the same receiver. That is, all layers may collectively provide the data to at least one common receiver. For example, the parts of the data represented by the partial modulation symbols are not multiplexing different streams of data to respectively different receivers in one radio resource used by the modulation symbol.

Representing the data by at least two partial modulation symbols may comprise splitting the data into the two or more parts represented by the respective partial modulation symbol. For example, a data stream to the receiver may be split into substreams, e.g., each corresponding to a layer of the radio transmission to the receiver. Each of the substreams may be associated with a modulator outputting the respective partial modulation symbol. For each of the substreams, the part of the data to be represented by the respective partial modulation symbol may be sequentially taken from the respective substream.

All of the at least two parts of the data represented by the respective at least two partial modulation symbols may belong to one or more data packets. Each of the data packets may be addressed to the receiver.

The at least two partial modulation symbols or the at least two parts of the data represented by the respective at least two partial modulation symbols may be non-redundant.

The at least two different partial modulation symbols, which are combined for generating the modulation symbol, may represent different parts of the data. The different parts of the data may be completely disjoint or independent or may overlap at most partially. For example, the different parts of the data may be related solely by the receiver being a common addressee of the data.

The parts of the data corresponding to the respective layers of the radio transmission may be independently encoded into codewords. Each of the two or more partial modulation symbols may result from the respective codeword according to a modulation scheme.

The codeword may result from applying a channel code to the data. The channel code may be a (e.g., linear) block code, a convolutional code, a turbo code, a Viterbi code or a low-density parity-check (LDPC) code. Each of the parts of the data may be encoded downstream of the splitting of the data.

Each of the layers may be associated with a modulator using the modulation scheme for outputting the respective partial modulation symbol. For example, the codeword of the respective layer may be input to the associated modulator. Each layer may comprise a processing chain including the modulator applying the modulation scheme downstream of an encoder applying the channel code.

Each of the codewords may (e.g., uniquely) represent the respective part of the data. Each of the partial modulation symbols may represent the respective part of the data, e.g., since the partial modulation symbol may be (e.g., uniquely) representative of the respective codeword.

Parameters of the multi-layer transmission (also: hierarchical modulation), e.g., at least one of a number of the layers, the modulation scheme and the encoding, may depend on a channel condition or a receiver condition for the radio transmission to the receiver or an average of the conditions (e.g., based on a sequence of reports from the receiver). While the multi-layer transmission can enable an adaptive demodulation at the receiver not requiring instant knowledge of the receiver condition at the transmitter, the parameters may be based on a temporal average of the conditions. There may be no need to know the instantaneous receiver condition at the transmitter. A time-scale of the averaging for the parameters may be longer than a time lag in conventional link adaptation (LA) that tracks the channel without or with shorter temporal averaging.

Each of the partial modulation symbols may represent the respective part of the data using the modulation scheme. Each of the layers may be associated with a modulator outputting the respective partial modulation symbol.

The number of the layers, the modulation scheme and/or the encoding (e.g., a modulation and coding scheme, MSC) may be adapted less frequently than the duration of the modulation symbol. For example, adapting at least one of the number of the layers, the different power levels, the modulation scheme and/or the encoding may be based on a report (e.g., a channel state information, CSI, report) and/or may take the time of a plurality of modulation symbols. As a numerical example, e.g., while a data packet may have a duration on the order of 1 ms, the parameters for the different layers may be updated based on a channel feedback every 10 s.

The modulation scheme may comprise at least one of phase shift keying (PSK, particularly quadrature phase shift keying, QPSK), Amplitude Shift Keying (ASK) and Quadrature Amplitude Modulation (QAM). Different amplitudes of the QAM may correspond to different power levels that are less than differences between the power levels according to the different layers.

The same modulation scheme may be used for at least two of the partial modulation symbols combined for generating the modulation symbol. For example, each of the at least two partial modulation symbols that are combined for generating the modulation symbol may use the same modulation scheme. Alternatively, or in addition, the at least two partial modulation symbols, which are combined for generating the modulation symbol, may use different modulation schemes.

Alternatively, or in addition, the different layers may use different channel codes (e.g., different code rates) for the encoding of the parts of the data (and accordingly for decoding the partial modulation symbols at the receiver).

Using different modulation schemes (e.g., in the representing step) and/or different coding schemes (e.g., for the encoding) for parts of the data corresponding to the different layers may enable a flexible or dynamical adaptation to the variations of the conditions. For example, a transmitter performing the method (or a system comprising the transmitter and the receiver) may support only two layers. The size of the data representable by the modulation symbol, i.e., the size of the final modulation alphabet (i.e., the combination of the modulation alphabets of the modulation schemes used at the respective layer for the partial modulation symbols) may largely vary by combining few different modulation schemes at the different layers. For example, the final symbol alphabet may achieve a size of $2^6=64$ using QPSK for one layer and using 16-QAM for another layer.

Each of the at least two partial modulation symbols may comprise at least one of a phase and an amplitude representing the respective part of the data. The modulation scheme may comprise a set of symbol candidates (i.e., the modulation alphabet of the respective modulation scheme) for the respective partial modulation symbol, e.g., in a constellation plane according to a constellation diagram. Each of the symbol candidates in the set may be different in terms of at least one of the phase and the amplitude. The partial modulation symbol representing the part of the data may be selected from the set (e.g., from the constellation diagram) depending on the part of the data.

The step of combining may comprise determining or scaling an amplitude of the partial modulation symbol according to the respective power level. The different power levels may correspond to scaled modulation alphabets or scaled constellation diagrams. Alternatively or in addition, the combining may correspond to modulation alphabets or constellation diagrams shifted in the constellation plane according to the partial modulation symbol of the next higher layer.

The layers may be ordered according to the respective power levels (e.g., by the integer index). The amplitude of each pair of consecutive layers may be scaled by a factor of 2 or more, the power of each pair of consecutive layers may be different by a factor of 4 or more and/or the power level of each pair of consecutive layers may be different by 6 dB or more. The different power levels may differ pairwise by 6 dB or more.

The radio transmission may use a channel that is subjected to at least one of noise and interference. The power levels may be controlled or determined depending on an average power of at least one of the noise and the interference and/or variations (e.g., the variance or size of the variations and/or a rate of the variations) of the power of at least one of the noise and the interference. For example, the average power of at least one of the noise and the interference may vary over a duration of the modulation symbol by the least power level of the different power levels or more. Alternatively, or in addition, the average power of at least one of the noise and the interference may vary by the least power level of the different power levels or more within a time period required for measuring the channel at the receiver and/or receiving a channel feedback based on the measurement from the receiver for adaptive coding and/or modulation.

Herein, to "vary by" a certain amount within a certain time may encompass that the temporal variance over said time is equal to or greater than the certain amount.

The time-scale of the variations or variance of the conditions may be less than the time-scale for adaptive coding and/or modulation based on the channel feedback. The channel feedback may comprise at least one of an implicit feedback and an explicit feedback. The implicit feedback may be indicative of a result of a previous radio transmission, e.g., a positive or negative acknowledgment feedback for previously transmitted data. The explicit feedback may be indicative of an average level of and/or the variations in the noise and/or the interference at the receiver and/or on the channel. Alternatively, or in addition, the explicit channel feedback may be indicative of (e.g., a suggestion for) a MCS to use for the data transmission.

The radio transmission may use a channel that is subjected to at least one of noise and interference. The data or each part of the data may belong to a data packet. A power of at least one of the noise and the interference may vary by the least power level of the different power levels or more within a time period between subsequently transmitted data packets.

The variations (e.g., the variance) may or may not be this large all the time. Some embodiments may beneficially use the technique, e.g. if the power of at least one of the noise and the interference varies by the least power level of the different power levels only in some occasions of the respectively specified time durations or time periods. For example, even if the variations from one data packet to the next data packet may only be 3 dB, a difference of 6 dB for the power levels between layers may still be beneficial (e.g., in terms of throughput), e.g., as compared to a conventionally optimized single-layer modulation.

Alternatively or in addition to determining the power levels associated with different layers based on the variations (e.g., the variance) of the conditions, the difference between the power levels associated with different layers may be determined by a total range to be covered (e.g., in terms of transmit power or coverage area) and/or the number of layers (e.g., a maximum number of layers available due to the number of processing chains at the transmitter). For example, the radio transmission may use a channel that is subjected to at least one of noise and interference, and the data may belong to a data packet. The method may further comprise or initiate a step of determining at least one of the number of layers and the different power levels, wherein the least power level of the different power levels is twice, equal to or less than the power of at least one of the noise and the interference.

The receiver may report (which is also referred to as channel feedback) the channel condition and/or the receiver condition (which is also referred to as conditions) without the need for instant knowledge of the conditions at the transmitter by virtue of the multi-layer transmission. For example, the reported conditions may be time-averaged on an averaging time-scale and/or the reports may be received with a periodicity, wherein the averaging time-scale or the periodicity is multiple times longer than a time-scale of the variations in the conditions at the receiver.

The power of the noise and/or the interference may be measured and/or reported as at least one of a received power (e.g., a reference signal received power, RSRP), a received channel power indicator (RCPI), a received signal strength indicator (RSSI), a signal to noise ratio, SNR, and a signal to noise and interference ratio, SNIR. For example, the noise power and/or the interference power may fluctuate over a duration of the modulation symbol by at least 2 decibel (dB). The reporting may be on a time-scale (e.g., the averaging time-scale or the periodicity), which may correspond to the transmission time of a large number of packets. For example, the channel feedback from the receiver may be received for every 100 packets or 1000 packets.

The data may be transmitted on a channel comprising a plurality of subcarriers. The modulation symbol may be transmitted on one of the subcarriers or each layer may generate a plurality of partial modulation symbols combined into a respective plurality of modulation symbols, each being mapped to one of the subcarriers. The transmission may comprise a radio transmission.

In a first example, a data packet has a duration of 1 ms. At time t=0, the interference at the receiver may be 10 times weaker than a desired signal (i.e., C/I=10 dB). Later, at time t=100 µs, the interference may be 100 times weaker than the desired signal (i.e., C/I=20 dB). By virtue of the multi-layer transmission more layers may be decodable at the receiver as compared to a conventional feedback-based LA, because the changes in C/I are too quick for a feedback-based LA.

In a second example, a data packet has a duration of 1 ms. At time t=0, the interference is as strong as the desired signal (i.e., C/I=0 dB). Later, at time t=100 µs, the interference is 10 times weaker than the desired signal (i.e., C/I=10 dB). By virtue of the multi-layer transmission more layers may be decodable at the receiver as compared to a convention feedback-based LA because the changes in C/I are too quick for a feedback-based LA.

Furthermore, the power offsets (i.e., the differences between the power levels) in the combined modulation symbol (i.e., for the hierarchical modulation) may be the same in the first example and in the second example, because the variations in C/I are the same. Still, the interference may be much stronger in second example. Optionally, the channel code (e.g., the code rate) used in the first example is different from the channel code used in the second example.

The channel conditions, e.g., the power of at least one of the noise and the interference, may be unpredictable on a time scale corresponding to the duration of the modulation symbol or multiples thereof (e.g., a subframe or slot) or the time period between subsequent data packet transmission. By using hierarchical layers (e.g., including a layer having a suitable power level corresponding to the noise and/or the interference), the respective part of the data may be selectively demodulated (e.g., and decoded) at the receiver whenever the channel conditions allow.

The combining may comprise coherently adding the at least two partial modulation symbols at the respective power level according to the respective layer.

The method may further comprise or initiate a step of receiving an acknowledgment feedback indicative of a number of successfully decoded layers (e.g., the number of demodulated and successfully decoded partial modulation symbols) based on the transmitted modulation symbol. The indicated number may be counted starting from the partial modulation symbol or layer at the highest power level and/or may be further counted in the order of decreasing power levels until (e.g., and including) the partial modulation symbol or layer at the least power level among the successfully decoded layers.

The acknowledgment feedback may be indicative of the number of successfully decoded layers. The number may imply a level of noise and/or interference at the receiver.

The same data may be transmitted to a first receiver and a second receiver. The acknowledgment feedback from the first receiver may be indicative of a first number of successfully decoded layers (e.g., demodulated and successfully decoded partial modulation symbols). The acknowledgment feedback from the second receiver may be indicative of a second number of successfully decoded layers (e.g., demodulated and successfully decoded partial modulation symbols) that is different from the first number.

A first partial modulation symbol transmitted with a greater power level than a second partial modulation symbol may be representative of a first part of the data associated with a greater priority or quality of service (QoS) than a second part of the data represented by the second partial modulation symbol. The data part with greater priority or QoS may be transmitted or retransmitted on a higher layer in terms of the power level.

The method may further comprise or initiate a step of transmitting a further modulation symbol comprising a retransmission of a part of the data represented by the previously transmitted modulation symbol. The retransmitted part may be represented by a partial modulation symbol in the further modulation symbol having a greater power level than the partial modulation symbol representative of the retransmitted part of the data in the previously transmitted modulation symbol. The layer used for the retransmission of a part of the data may be increased relative to the layer used for the same part in the previous transmission without increasing the total power of the retransmission relative to the previous transmission.

As to a second method aspect, a method of radio receiving data is provided. The method may comprise or initiate a step of receiving a modulation symbol that is a combination of at least two partial modulation symbols at different power levels. The method may further comprise or initiate a step of demodulating, based on the received modulation symbol, a partial modulation symbol and subtracting the demodulated partial modulation symbol from the received modulation symbol resulting in a residual modulation symbol. The method may further comprise or initiate a step of repeating the demodulation based on the residual modulation symbol for demodulating the at least two partial modulation symbols representing the data.

The partial modulation symbol may be subtracted from the received modulation symbol if and only if the partial modulation symbol has been successfully decoded. Repeating the demodulation may further comprise, e.g., if the demodulated partial modulation symbol is successfully decoded, subtracting the demodulated partial modulation symbol from the previous residual modulation symbol. If the demodulation or decoding fails (e.g., at any point be it the first demodulation or a subsequent demodulation), the subtracting and repeating of the demodulation may be terminated for the received modulation symbol.

The second method aspect may be implemented by a layered decoding approach at the receiver. Various layers may be decoded one after each other and/or independently. Moreover, each of the transmitted layers may be acknowledged separately in the acknowledgment feedback to the receiver. Alternatively, or in addition, the coding (i.e., the encoding at the receiver and the decoding at the receiver) may be selected independently for the different layers (i.e., independent of the other layers). The coding may be self-contained for each of the layers. The parameters (e.g., power levels and/or MCSs) controlling the relative robustness of the different layers may be adjusted to the expected variation (e.g., the variance) in the conditions, e.g., due to interference or noise.

The received modulation symbol may be successively demodulated (e.g., and decoded), e.g., layer by layer, by subtracting the demodulated (e.g., and decoded) modulation symbol of the next-higher layer.

The demodulation and/or decoding may be repeated in the order of decreasing power levels until the demodulation or the decoding of the demodulated partial modulation symbol fails. The failure of the decoding may be determined by an error (e.g., a failed cyclic redundancy check, CRC) when decoding the demodulated partial modulation symbol.

The method may further comprise or initiate a step of transmitting an acknowledgment feedback to a transmitter of the received modulation symbol, the acknowledgment feedback being indicative of a number of successfully decoded partial modulation symbols based on the received modulation symbol. The number may correspond to the number of repetitions. The number may be counted starting from the partial modulation symbol at the highest power level and in the order of decreasing power levels until the partial modulation symbol at the least power level among the successfully decoded partial modulation symbols.

The second method aspect may further comprise any feature, or may comprise or initiate any step, disclosed in the context of the first method aspect or may comprise a feature or step corresponding thereto. For example, at least two of the partial modulation symbols combined in the received modulation symbol may correspond to the same modulation scheme applied at different power levels.

Moreover, the first method aspect may be performed at or by a transmitting station (briefly: transmitter), e.g., a base station for a downlink or a radio device for an uplink or a sidelink connection. Alternatively, or in combination, the second method aspect may be performed at or by a receiving station (briefly: receiver), e.g., a base station for an uplink or a radio device for a downlink or a sidelink connection.

The channel or link used for the data transmission and the radio reception, i.e., the channel between the transmitter and the receiver may comprise multiple subchannels or subcarriers (as a frequency domain). Alternatively, or in addition, the channel or link may comprise one or more slots for a plurality of modulation symbols (as a time domain). Alternatively, or in addition, the channel or link may comprise a directional transmission (also: beamforming transmission) at the transmitter, a directional reception (also: beamforming reception) at the receiver or a multiple-input multiple-output (MIMO) channel with two or more spatial streams (as a spatial domain). A modulation symbol according to the technique may be transmitted and received for each of a plurality of resource elements defined in at least one of the time domain, the frequency domain and the spatial domain.

The transmitter and the receiver may be spaced apart. The transmitter and the receiver may be in data or signal communication exclusively by means of the radio communication.

In any aspect, the transmitter and the receiver may form, or may be part of, a radio network, e.g., according to the Third Generation Partnership Project (3GPP) or according to the standard family IEEE 802.11 (Wi-Fi). The radio network may be a radio access network (RAN) comprising one or more base stations. Alternatively, or in addition, the radio network may be a vehicular, ad hoc and/or mesh network. The first method aspect may be performed by one or more embodiments of the transmitter in the radio network. The second method aspect may be performed by one or more embodiments of the receiver in the radio network.

Any of the radio devices may be a mobile or wireless device, e.g., a 3GPP user equipment (UE) or a Wi-Fi station (STA). The radio device may be a mobile or portable station, a device for machine-type communication (MTC), a device for narrowband Internet of Things (NB-IoT) or a combination thereof. Examples for the UE and the mobile station include a mobile phone, a tablet computer and a self-driving vehicle. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in a manufacturing plant, household appliances and consumer electronics.

Any of the radio devices may be wirelessly connected or connectable (e.g., according to a radio resource control, RRC, state or active mode) with any of the base stations. Herein, the base station may encompass any station that is configured to provide radio access to any of the radio devices. The base stations may also be referred to as transmission and reception point (TRP), radio access node or access point (AP). The base station or one of the radio devices functioning as a gateway (e.g., between the radio network and the RAN and/or the Internet) may provide a data link to a host computer providing the data. Examples for the base stations may include a 3G base station or Node B, 4G base station or eNodeB, a 5G base station or gNodeB, a Wi-Fi AP and a network controller (e.g., according to Bluetooth, ZigBee or Z-Wave).

The RAN may be implemented according to the Global System for Mobile Communications (GSM), the Universal Mobile Telecommunications System (UMTS), 3GPP Long Term Evolution (LTE) and/or 3GPP New Radio (NR).

Any aspect of the technique may be implemented on a Physical Layer (PHY), a Medium Access Control (MAC) layer, a Radio Link Control (RLC) layer and/or a Radio Resource Control (RRC) layer of a protocol stack for the radio communication.

As to another aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download, e.g., via the radio network, the RAN, the Internet and/or the host computer. Alternatively, or in addition, the method may be encoded in a Field-Programmable Gate Array (FPGA) and/or an Application-Specific Integrated Circuit (ASIC), or the functionality may be provided for download by means of a hardware description language.

As to a first device aspect, a device for radio transmitting data is provided. The device may be configured to perform any one of the steps of the first method aspect. Alternatively, or in addition, the device may comprise a representing unit configured to represent data to be transmitted to a receiver by at least two partial modulation symbols. Each of the at least two partial modulation symbols may be associated to a different layer of the radio transmission to the receiver. Alternatively, or in addition, the device may comprise a generating unit configured to generate a modulation symbol by combining the at least two partial modulation symbols at different power levels according to the associated layer. Alternatively, or in addition, the device may comprise a transmitting unit configured to transmit the modulation symbol to the receiver.

As to a second device aspect, a device for radio receiving data is provided. The device may be configured to perform any one of the steps of the second method aspect. Alternatively, or in addition, the device may comprise a receiving unit configured to receive a modulation symbol that is a combination of at least two partial modulation symbols at different power levels. Alternatively, or in addition, the device may comprise a demodulating unit configured to demodulate, based on the received modulation symbol, a partial modulation symbol and to subtract the demodulated partial modulation symbol from the received modulation symbol resulting in a residual modulation symbol. Alternatively, or in addition, the device may comprise a repeating unit configured to repeat the demodulation based on the residual modulation symbol for demodulating the at least two partial modulation symbols representing the data.

Repeating the demodulation may be implemented by inputting the residual modulation symbol to the repeating unit, which may output the next demodulated partial modulation symbol and a further residual modulation symbol.

As to a further first device aspect, a device for radio transmitting data is provided. The device comprises at least one processor and a memory. Said memory may comprise instructions executable by said at least one processor whereby the device is operative to represent data to be transmitted to a receiver by at least two partial modulation symbols. Each of the at least two partial modulation symbols may be associated to a different layer of the radio transmission to the receiver. Execution of the instructions may further cause the device to be operative to generate a modulation symbol by combining the at least two partial modulation symbols at different power levels according to the associated layer. Execution of the instructions may further cause the device to be operative to transmit the modulation symbol to the receiver. The device may be further operative to perform any of the steps of the first method aspect.

As to a further second device aspect, a device for radio receiving data is provided. The device comprises at least one processor and a memory. Said memory may comprise instructions executable by said at least one processor whereby the device is operative to receive a modulation symbol that is a combination of at least two partial modulation symbols at different power levels. Execution of the instructions may further cause the device to be operative to demodulate, based on the received modulation symbol, a partial modulation symbol and to subtract the demodulated partial modulation symbol from the received modulation symbol resulting in a residual modulation symbol. Execution of the instructions may further cause the device to be operative to repeat the demodulation based on the residual modulation symbol for demodulating the at least two partial modulation symbols representing the data. The device may be further operative to perform any of the steps of the second method aspect.

As to a still further aspect a communication system including a host computer is provided. The host computer may comprise a processing circuitry configured to provide user data, e.g., depending on the location of the UE determined in the locating step. The host computer may further comprise a communication interface configured to forward user data to a cellular network for transmission to a user equipment (UE), wherein the UE comprises a radio interface and processing circuitry, a processing circuitry of the cellular network being configured to execute any one of the steps of the first and/or second method aspect.

The communication system may further include the UE. Alternatively, or in addition, the cellular network may further include one or more base stations and/or gateways configured to communicate with the UE and/or to provide a data link between the UE and the host computer using the first method aspect and/or the second method aspect.

The processing circuitry of the host computer may be configured to execute a host application, thereby providing the user data and/or any host computer functionality described herein. Alternatively, or in addition, the processing circuitry of the UE may be configured to execute a client application associated with the host application.

Any one of the devices, the UE, the base station, the system or any node or station for embodying the technique may further include any feature disclosed in the context of the method aspects, and vice versa. Particularly, any one of the units and modules, or a dedicated unit or module, may be configured to perform or initiate one or more of the steps of the method aspect.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented for any other radio communication technique, including 3GPP LTE (e.g., LTE-Advanced or a related radio access technique such as MulteFire), in a Wireless Local Area Network (WLAN) according to the standard family IEEE 802.11, for Bluetooth according to the Bluetooth Special Interest Group (SIG), particularly Bluetooth Low Energy, Bluetooth Mesh Networking and Bluetooth broadcasting, for Z-Wave according to the Z-Wave Alliance or for ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
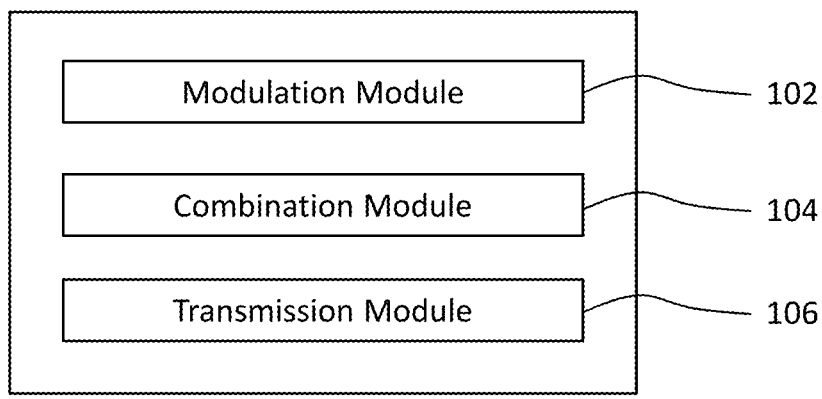
FIG. 1 shows an example schematic block diagram of a device for radio transmitting data.

FIG. 1 schematically illustrates an example block diagram of a device for radio transmitting data. The first radio device is generically referred to by reference sign 100.

The device 100 comprises a modulation module 102 that represents data to be transmitted to a receiver by at least two partial modulation symbols. Each of the partial modulation symbols is associated to a different layer of the radio transmission to the receiver. The device 100 further comprises a combination module 104 that generates a modulation symbol by combining the at least two partial modulation symbols at different power levels according to the associated layer. The device 100 further comprises a transmission module 106 that transmits the modulation symbol to the receiver.

Any of the modules of the receiving device 100 may be implemented by units configured to provide the corresponding functionality.

The device 100 may also be referred to as, or may be embodied by, a transmitting station or a transmitter. The device 100 and the receiver are in a radio communication at least for the data transmission at the device 100.

Figure 2:
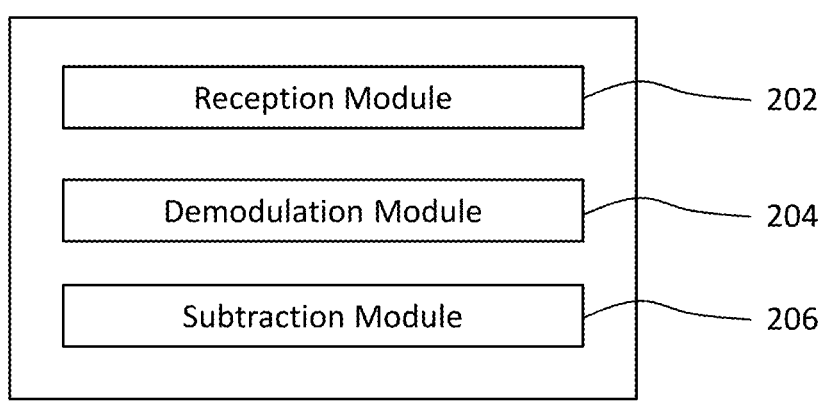
FIG. 2 shows an example schematic block diagram of a device for radio receiving data.

FIG. 2 schematically illustrates an example block diagram of a device for radio receiving data. The device is generically referred to by reference sign 200.

The device 200 comprises a reception module 202 that receives a modulation symbol. The modulation symbol is a combination of at least two partial modulation symbols at different power levels. The device 200 further comprises a demodulation module 204 that demodulates, based on the received modulation symbol, a partial modulation symbol. The device 200 further comprises a subtraction module 206 that subtracts the demodulated partial modulation symbol from the received modulation symbol resulting in a residual modulation symbol. The demodulation module 204 and the subtraction module 206 may be coupled to repeat the demodulation based on the residual modulation symbol for demodulating (e.g., one after another or each of) the at least two partial modulation symbols representing the data.

Any of the modules of the device 200 may be implemented by units configured to provide the corresponding functionality.

The device 200 may also be referred to as, or may be embodied by, a receiving device or a receiver. The device 200 and a transmitter of the data are in a radio communication at least for the data reception at the device 200.

Figure 3:
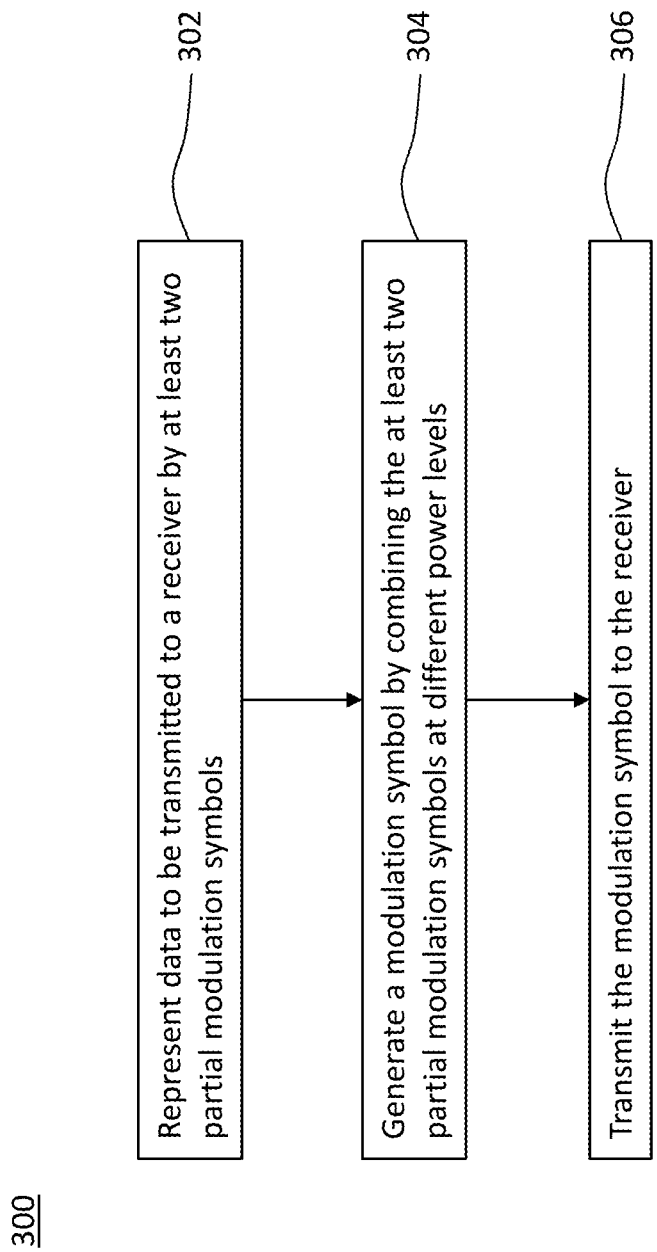
FIG. 3 shows an example flowchart for a method of radio transmitting data, which method may be implementable by the device of FIG. 1.

FIG. 3 shows an example flowchart for a method 300 of radio transmitting data. The method 300 comprises or initiates a step 302 of representing data to be transmitted to a receiver by at least two partial modulation symbols, each associated to a different layer of the radio transmission to the receiver. The method 300 further comprises or initiates a step 304 of generating a modulation symbol by combining the at least two partial modulation symbols at different power levels according to the associated layer. The method 300 further comprises or initiates a step 306 of transmitting the modulation symbol to the receiver.

The method 300 may be performed by the device 100. For example, the modules 102, 104 and 106 may perform the steps 302, 304 and 306, respectively.

Figure 4:
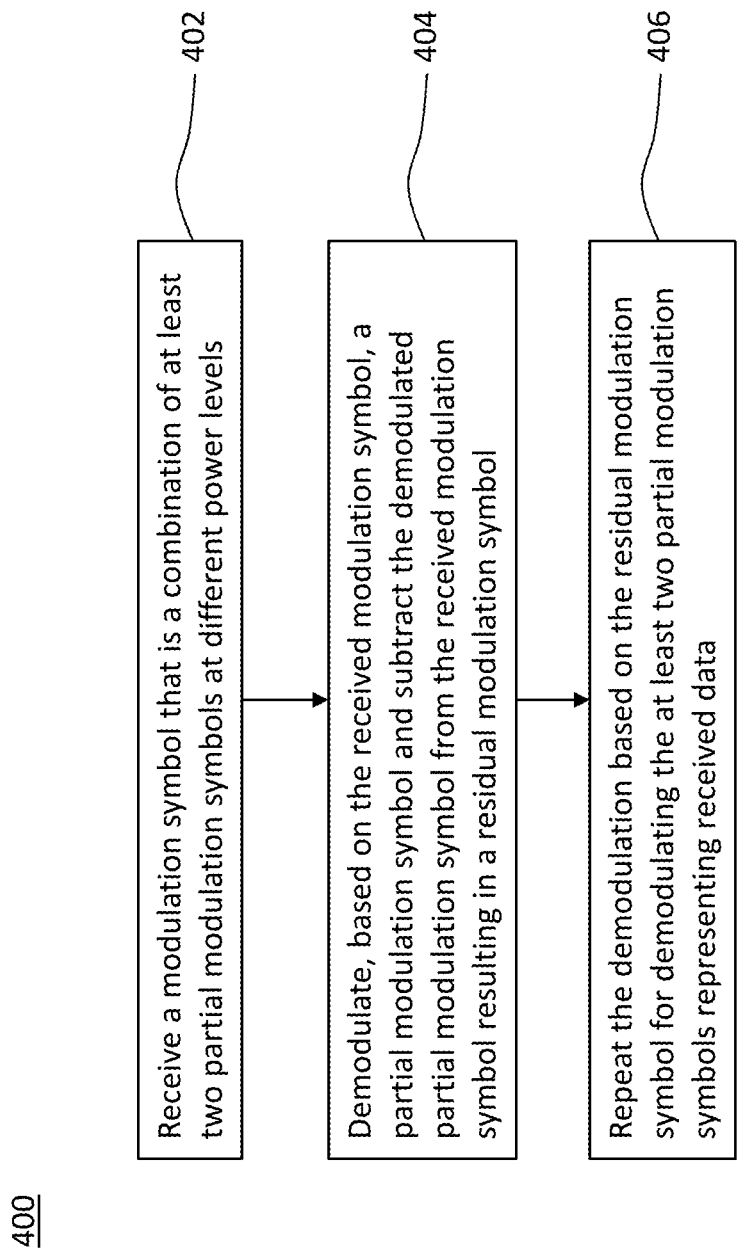
FIG. 4 shows an example flowchart for a method of radio receiving data, which method may be implementable by the device of FIG. 2.

FIG. 4 shows an example flowchart for a method 400 of radio receiving data. The method 400 comprises or initiates a step 402 of receiving a modulation symbol that is a combination of at least two partial modulation symbols at different power levels. The method 400 further comprises or initiates a step 404 of demodulating, based on the received modulation symbol, a partial modulation symbol and subtracting the demodulated partial modulation symbol from the received modulation symbol resulting in a residual modulation symbol. The method 400 further comprises or initiates a step 406 of repeating the demodulation 404 based on the residual modulation symbol for demodulating 404 (and where applicable for subtracting) the at least two partial modulation symbols representing the data.

The method 400 may be performed by the device 200. For example, the modules 202, 204 and 206 may perform the steps 402, 404 and 406, respectively.

The technique may be applied to uplink (UL), downlink (DL) or direct communications between radio devices, e.g., device-to-device (D2D) communications or sidelink communications.

Each of the device 100 and the device 200 may be a radio device and/or a base station. Herein, any radio device may be a mobile or portable station and/or any radio device wirelessly connectable to a base station or RAN, or to another radio device. A radio device may be a user equipment (UE), a device for machine-type communication (MTC) or a device for (e.g., narrowband) Internet of Things (IoT). Two or more radio devices may be configured to wirelessly connect to each other, e.g., in an ad hoc radio network or via a 3GPP sidelink connection. Furthermore, any base station may be a station providing radio access, may be part of a radio access network (RAN) and/or may be a node connected to the RAN for controlling radio access. Further a base station may be an access point, for example a Wi-Fi access point.

According to the method 300 for the radio transmission of the data, the data may be transmitted using multiple layers, wherein a robustness of the different layers is different. Alternatively, or in addition, each of the layers may be at least one of individually decoded and individually acknowledged.

The method 300 may be selectively performed. The transmitter 100 may select to use or to turn off feature or steps for transmitting the data using different layers. E.g., instead of the steps 302 and 304, the data to be transmitted may be represented by a single modulation symbol that is transmitted in the step 306 to the transmitter, i.e. the data is transmitted using a single layer.

The transmitter 100 may transmit data to two or more devices. The data may be transmitted to one receiver and at least one further receiver. That is, the data is transmitted using multi-layer transmission 306 to at least one of the devices. Optionally, the data is transmitted using a single layer to at least another one of the devices.

The selection of whether to perform multi-layer transmission 306 or a single transmission may be based on how much the channel conditions and/or receiver conditions (collectively: conditions) are known or expected to vary, e.g., based on channel feedback. The multi-layer transmission may be selected in case the conditions are expected to vary more than a certain amount, e.g. a predefined or preconfigured threshold value. A single layer transmission may be selected if the conditions are expected to vary less than a certain amount, e.g. a predefined or preconfigured threshold value.

The variations (e.g., the variance) may be due to varying interference conditions and/or noise conditions at the receiver 200 and/or on the channel. These conditions may or may not be measurable at the transmitter 100, e.g., in a hidden-node situation.

The variations may be due to at least one of the receiver and/or the transmitter moving in the radio network, e.g., at a velocity above a predefined or preconfigured threshold value.

Transmission parameters may comprise the different power levels associated to the different layers or the differences between neighboring power levels. The (e.g., relative) robustness of the layers may be defined by the respectively associated power levels (e.g., applied in the step 304 for the respective layer), a modulation scheme (e.g., applied in the step 302 for the respective layer) and/or a coding scheme (e.g., applied in the step 302 for the respective layer).

The transmission parameters, e.g., the robustness, may be controlled based on how much the conditions are known or expected to vary. The relative robustness may be controlled by applying a power level offset to the different layers.

Alternatively, or in addition, the relative robustness may be controlled by applying an error-correcting coding with different robustness to the different layers. The different robustness of the error-correcting coding may be achieved by using error-correcting codes of different code rates.

The difference in robustness of the most robust layer and the least robust layer may be related to the known or expected variation of the conditions.

In any embodiment, the different parts of the data to be transmitted may be associated to different priorities and/or different data packets. The respective priority or data packet may determine the layer (i.e., the relative power level) to be used for the respective part of the data (i.e., for the respective partial modulation symbol representing said part of the data). Alternatively, or in addition, which layer to use for a certain part of the data may depend on how many times said part has been retransmitted (e.g., how many times a corresponding data packet comprising said part of the data has been retransmitted).

Figure 5:
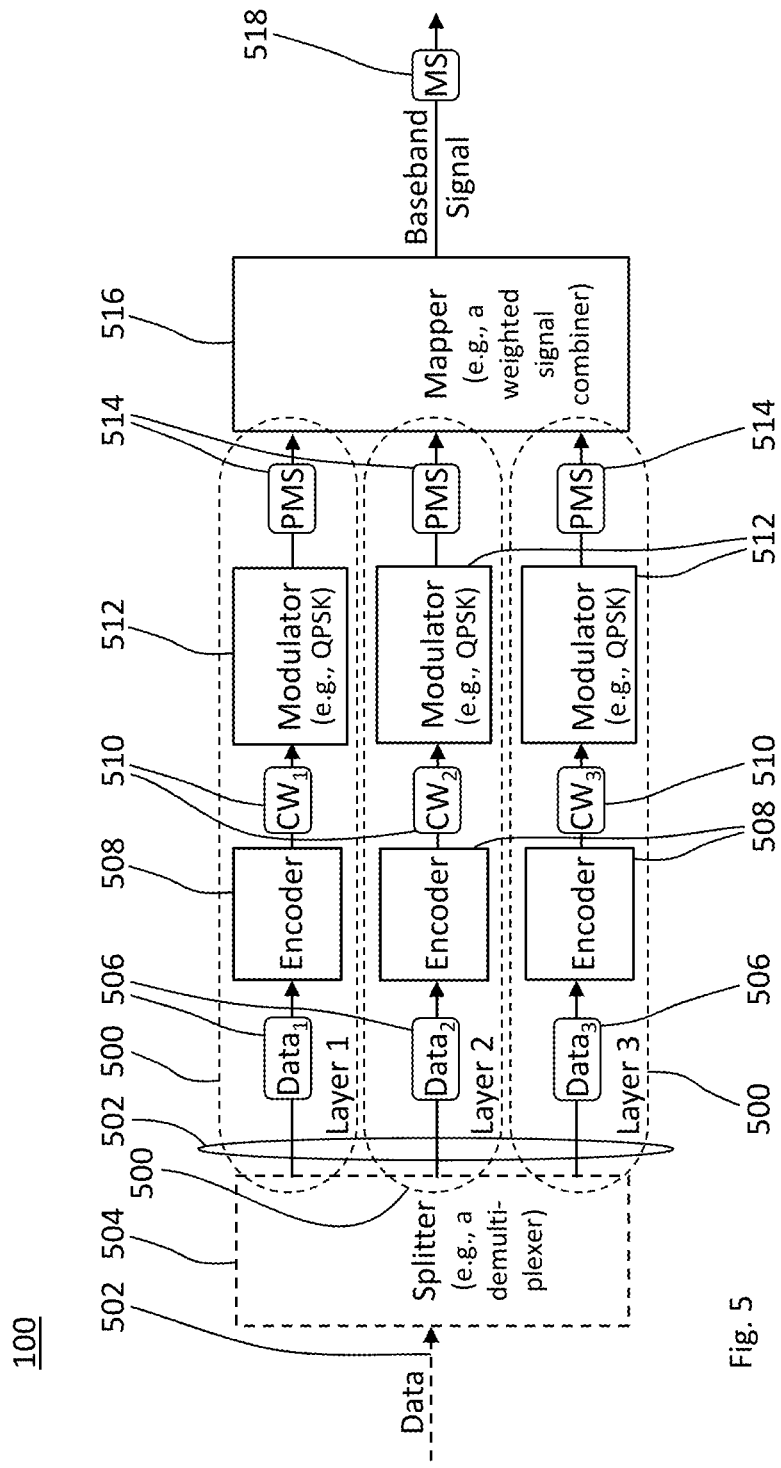
FIG. 5 shows a schematic block diagram of an embodiment of the device of FIG. 1.

FIG. 5 shows a schematic block diagram for an embodiment of the transmitter 100. Optionally, the data 502 to be transmitted in the step 306 may be split at reference sign 504 into the parts 506 of the data associated to the different layers 500. Alternatively, or in addition, a higher protocol layer of a protocol stack at the transmitter 100 may provide the different parts 506 separately. For example, the different parts 506 may correspond to different data streams, different data packets and/or different HARQ entities.

A typical procedure when transmitting information (i.e., the data 502) is that the information is encoded by an error-correcting encoder 508. The resulting coded bits 510 (also: codeword) are modulated using a suitable modulation scheme 512 (also: modulation format). The error-correcting code 508 may, for instance, be a binary convolution code (BCC) or a low-density parity check (LDPC) code.

Examples for the modulation schemes 512 may comprise phase shift keying (PSK) or M-ary quadrature amplitude modulation (M-QAM).

In the embodiment of FIG. 5, two or more encoders 508 and two or more modulators 512 are used in parallel, e.g., one encoder 508 and one modulator 512 in association with each layer 500. The encoders 508 and modulators 512 may embody the modulation module 102 performing the step 302. The output of the different modulators 512, i.e., the partial modulation symbols 514, are combined by a mapper 516 into a single symbol, i.e., the modulation symbol 518, according to the step 304. The mapper 516 may embody the combination module 104. The mapper 516 may add the partial modulation symbols 514 in a digital domain or may be implemented by a signal combiner. Both implementations may take the associated power level into account, e.g., as scaling factors or gain, when combining the partial modulation symbols 514.

The schematically illustrated block diagram for an embodiment of the transmitter 100 depicted in FIG. 5 can be modified in many ways. For example, in this illustrated embodiment, there are three layers 500, while variants of the embodiment may comprise 4 or more layers 500 or only two layers 500. Furthermore, while the embodiment in FIG. 5 has separate processing chains for each layer 500, in a variant of the embodiment, some of the components 508 and/or 512 are shared between the different layers 500. For example, some components 508 and/or 512 may be time-shared or sequentially applied to the different layers.

As a non-limiting example, each layer 500 in the embodiment of FIG. 5 is modulated using QPSK, i.e., each part 506 of the data 502 comprises two bits of the information or data 502. The three QPSK streams comprising the respective partial modulation symbols 514 are then combined by the mapper 516 into the modulation symbol 518, i.e., 6 bits of information in total for the three layers 500.

While features of an embodiment of the transmitter 100 have been described with reference to FIG. 1 and/or FIG. 5, an embodiment of the receiver 200 may comprise the same features or corresponding features.

Figure 6:
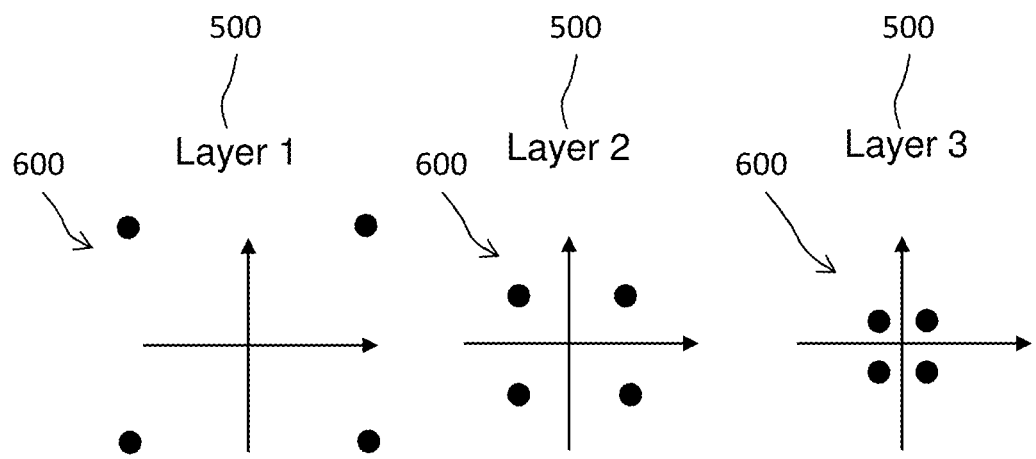
FIG. 6 schematically illustrates examples for partial modulation symbols, which may be usable for the methods of FIGS. 3 and 4.

To further illustrate how embodiments of the transmitter 100 work, example modulation schemes 512 (e.g., for the three layers 500) are depicted in FIG. 6. The black dots represent the symbol alphabet in the complex plane or constellation plane 600. That is, each dot is a constellation point or candidate for the partial modulation symbol 514 depending on the respective part 506 of the data 502.

All layers 500 shown in FIG. 6 are using QPSK as the modulation scheme 512, but the different layers 500 are allocated or associate with different (e.g., relative) power levels. Layer 500 with index i=1 is allocated the most power (i.e., the greatest power level), layer 500 with index i=2 is allocated the second most power or the second least power, and layer 500 with index i=3 is allocated the least amount of power (i.e., the least power level). As illustrated with reference to the examples for the modulation schemes 512 and symbol alphabets in FIG. 6, the symbol alphabet may already take the power level of the associated layer 500 into account, so that no further weighting or scaling is necessary when the partial modulation symbols 514 are combined.

The three layers 500 may be then combined in the step 304 by means of superposition, i.e., the combined constellation point of the modulation symbol 518 finally transmitted in the step 306 is the sum of the constellation points for the respective partial modulation symbols 514 of the three layers 500.

Figure 7:
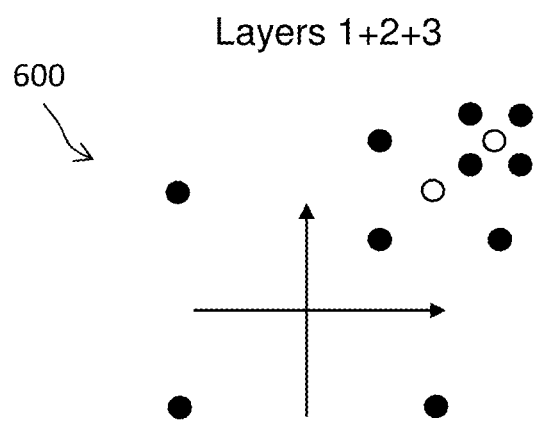
FIG. 7 schematically illustrates an example for a modulation symbol resulting from a combination of partial modulation symbols, which may be usable for the methods of FIGS. 3 and 4.

FIG. 7 schematically illustrates an example implementation of the combining step 304. Combining the three layers i=1, 2 and 3, each carrying $n_i$ bits as the respective part 506 of the data 502, generates in the step 304 one out of $2^{(n1+n2+n3)}$ possible modulation symbols 518.

The four candidates of layer i=1 are illustrated, wherein the circle indicating the candidate in the first quadrant is not filled, whereas the other candidates of the layer i=1 are represented by filled circles. In this case, it is the candidate indicated by the non-filled circle that is transmitted by the layer i=1, i.e., the partial modulation symbol 514 of the layer i=1. In an analogous manner, the four candidates of the layer i=2 are also illustrated, centered around (i.e., shifted to) the non-filled point of the layer i=1 to indicate that the candidate to eventually be transmitted is obtained by adding the vectors representing the partial modulation symbols 514 of the respective layers 500. Also, for the layer i=2, it is the candidate indicated by the non-filled circle in the first quadrant that is transmitted, i.e., that is the partial modulation symbol 514 of the layer i=2. The QPSK signal, i.e., the partial modulation symbol 514, corresponding to the layer i=3 is depicted with a center of gravity around or origin at the (e.g., previously shifted) partial modulation symbol 514 of the layer i=2. For the layer i=3, all candidates of the respective partial modulation symbol 514 are indicated by filled circles.

Referring to the example shown in FIG. 7, it is readily seen that the layer i=1 is more robust than the layer i=2, which in turn is more robust than the layer i=3. Furthermore, the skilled person appreciates that the relative robustness for the different layers 500 may be adjusted as found appropriate, e.g., responsive to a channel feedback indicative of variations in channel conditions and/or receiver conditions.

As an example, further referring to FIG. 7, by letting the powers of the layer i=2 and the layer i=3 be very small compared to the power used for the layer i=1, the resulting signal constellation can be made to almost look like QPSK, and consequently the performance for Layer 1 would be similar to that of QPSK, whereas the performance (e.g., an individual symbol error rate) for the layer i=2 and the layer i=3 would be substantially susceptible to the current level of noise and/or interference, e.g., would be substantially worse depending on the current level of noise and/or interference.

Conversely, the transmitter 100 may apply a power offset that is relatively small (compared to the greatest power level associated to the layer i=1) in order to obtain decent performance for the less robust layers i=2 and i=3. In case of such transmission parameters, the performance for the layer i=1 would be somewhat degraded.

This trade-off between the robustness of the different layers 500 may be visualized in FIG. 7 by, e.g., considering what amount of induced noise or interference it takes to cause a demodulation error for one of the partial modulation symbols of the different layers 500.

Figure 8:
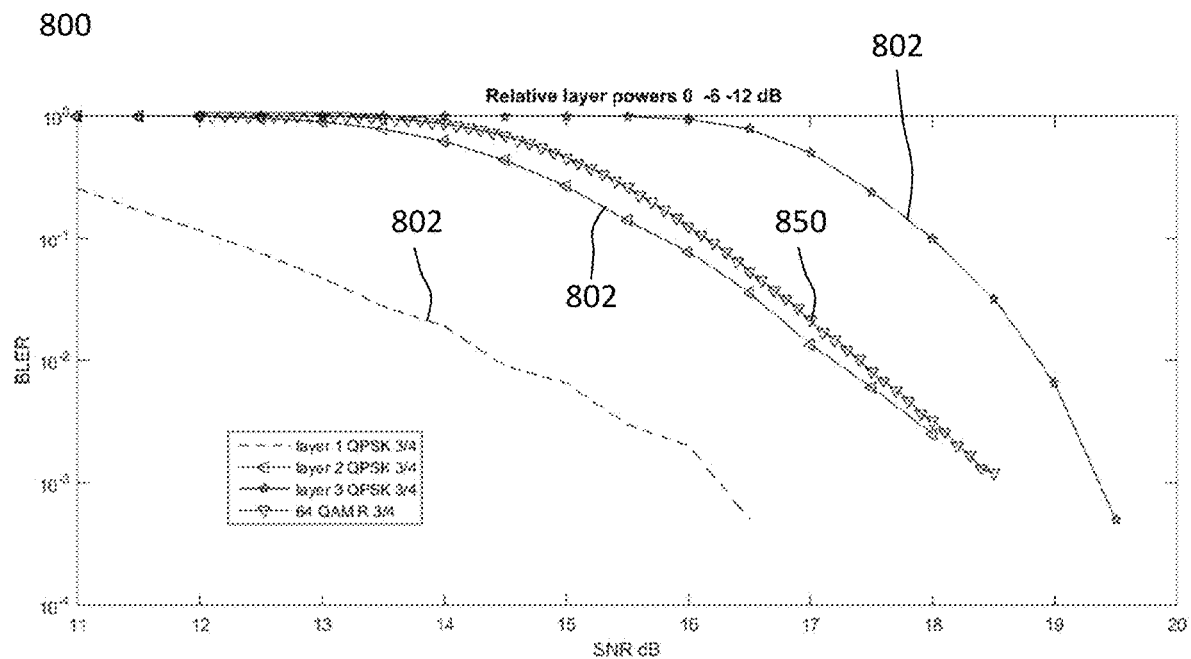
FIG. 8 schematically illustrates a block error rate of individual layers resulting from an embodiment of the radio devices of FIGS. 1 and 2 in radio communication.

FIG. 8 shows example graphs 802 resulting from a numerical simulation of link performance 800, namely, the symbol error rate or block error rate (BLER on the vertical axis) for each of the layers i=1, i=2 and i=3, respectively, as well as a corresponding performance 850 for conventional 64-QAM with the same BCC, as a function of the signal-to-noise ratio (SNR on the horizontal axis).

To appreciate the potential gain that can be achieved by embodiments of the technique, some simulations were performed. A transmitter 100 structured as the one depicted in FIG. 5 was implemented. The error-correcting code 508 was a BCC with a memory (or memory order) being 6 and a code rate being 3/4. The relative power offset between the different layers was set to −C=6 dB, i.e., the layer i=2 was 6 dB stronger than the layer i=3 and the layer i=1 was 6 dB stronger than the layer i=2. The results are shown in FIG. 8.

Referring to FIG. 8, e.g. at a BLER of 1%, it is observed that the layer i=1 is about 3 dB more robust than conventional 64-QAM, the layer i=2 is slightly more robust (e.g., 0.2 dB to 0.3 dB), whereas the layer i=3 is about 1.5 dB worse.

Figure 9:
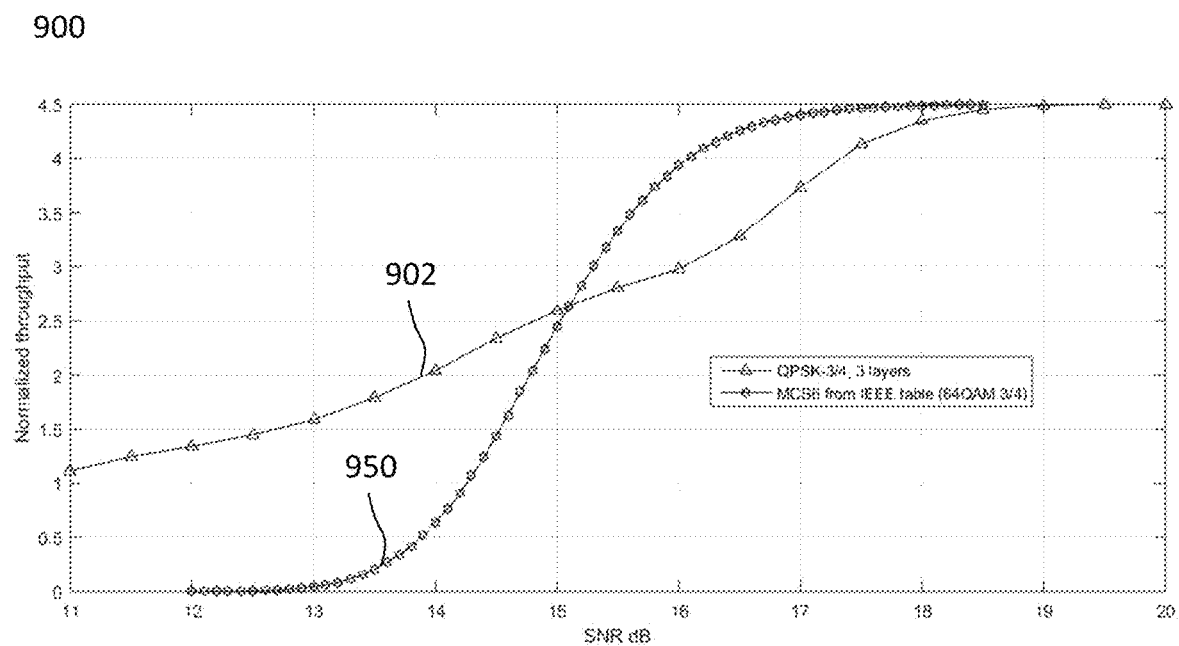
FIG. 9 schematically illustrates a data throughput resulting from an embodiment of the radio devices of FIGS. 1 and 2 in radio communication as well as a comparative example.

FIG. 9 shows an example performance 900 in terms of the data rate (or throughput) as a function of the SNR. More specifically, FIG. 9 shows a graph for the sum 902 of the data rates that is collectively obtained by the three layers 500. FIG. 9 further shows a graph 950 of the data rate achieved by using conventional 64-QAM as a comparative example. Based on a comparison of the total data rate 902 and the conventional data rate 950, one or two threshold values for selectively performing the multi-layer transmission 306 or a single-layer transmission may be determined, i.e. which one is the better of the two transmission modes.

In the example illustrated in FIG. 9, for a SNR lower than 15 dB, the multi-layer transmission is preferred. If the SNR is between 15 dB and 19 dB, using conventional 64-QAM gives better throughput 950. For a SNR greater than 19 dB, the performance is the same as both transmission modes achieved essentially error-free communication.

An implementation of the method 400 at the receiver 200 used to obtain the performance shown in FIG. 8 is based on successive interference cancellation (SIC), i.e., subtraction of the respectively demodulated partial modulation symbol 514, according to the steps 404 and 406. The different layers 500 are decoded one after another starting with the layer i=1 and continuing with the layer i=2, etc.

While the technique has been described using SIC at the receiver 200, the technique is applicable not only when the receiver 200 is based on SIC, but also if simpler or more complex algorithms are used. Examples of simpler algorithms include decoding the each of the different layers 500 without using any information from the other layers 500. Examples of more complex algorithms include jointly decoding all layers 500.

For example, the two or more layers (e.g., the 3 layers in above embodiment) may be jointly demodulated. The respective codewords (e.g., soft bits or hard bits) resulting from the demodulation may be decoded independently for each of the layers. That is, hard or soft bits for all layers may be jointly derived from the samples of the received modulation symbol 518. The hard or soft bit calculation uses the fact that the sample of the received modulation symbol 518 is the superposition of the partial modulation symbols 514. The procedure of estimating hard bits comprises hypothesizing the transmitted bits in each layer 500. Based on each hypothesis, a hypothesis of the partial modulation symbol is generated according to the modulation scheme 512 for each layer 500 and a combined modulation symbol (i.e., a hypothesis of the transmitted modulation symbol 518) is generated (e.g., according to the mapper 516). A received signal of the received modulation symbol 518 (preferably after equalization, i.e., removing the effect of the channel) is compared to the hypothesized combination of partial modulation symbols (i.e., a hypothesis of the transmitted modulation symbol 518). Hard bit decisions correspond to a hypothesis of the data bits that yields a combined modulation symbol that is closest (e.g., in Euclidean distance) to the equalized received signal. The calculation of soft bits is similar, but for each data bit, a reliability value (e.g., a log-likelihood) is computed, e.g., by methods well-known in the art. The hard or soft bits from each layer 500 are then fed to the corresponding decoders. Decoding is performed independently for each layer 500.

At first glance, it might seem that a comparison (as the one presented in FIG. 9) between a transmission using multiple layers 500 and a fixed single-layer transmission is not realistic, because a practical system using single-layer transmission would typically perform link adaptation (LA) and, therefore, would not use the conventional 64-QAM when the SNR is below, say, below 15 dB. However, a problem associated with LA for single-layer transmission is that LA assumes stable channel conditions in order to work properly.

Figure 10:
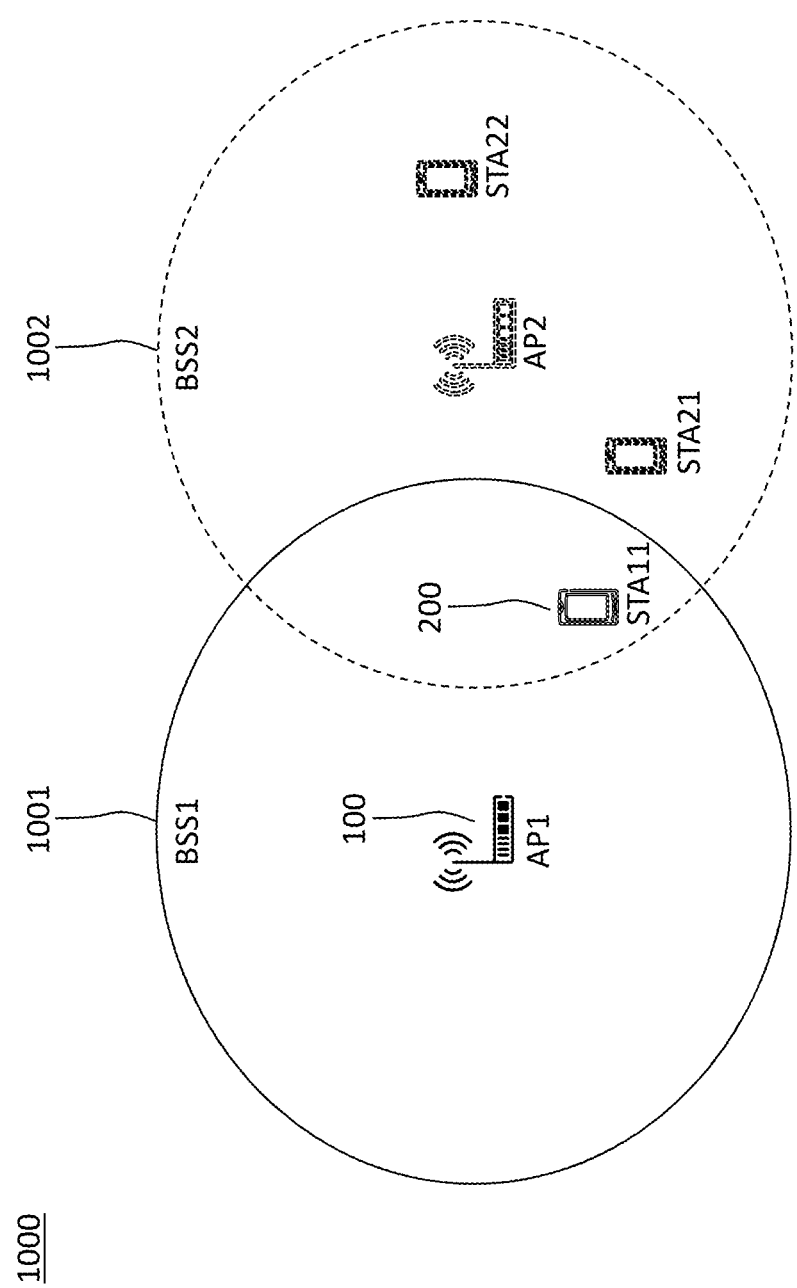
FIG. 10 schematically illustrates embodiments of the radio devices of FIGS. 1 and 2 in an exemplary hidden-node radio environment.

FIG. 10 schematically illustrates an exemplary deployment of the technique in an exemplary Wi-Fi radio environment 1000 comprising two basic service sets (BSSs) 1001 and 1002 using shared radio spectrum for illustrating a scenario with varying levels of interference.

While a channel access mechanism (e.g., CSMA/CA) may reduce the occurrence of collisions on the shared radio spectrum, there are many situations in which it does not work very well. An example situation is the so-called hidden node problem, since a listen before talk (LBT) process performed by the radio device intended to initiate a transmission is without knowledge of the current interference conditions at a radio device intended for the reception. An example of such a situation is illustrated in FIG. 10. An Access Point labeled AP1 may embody the transmitter 100, which is not within the coverage area of any of the devices belonging to BSS 1002, so if AP1 has data 502 to transmit to a station labeled STA11 embodying the receiver 200, it will initiate a transmission.

As schematically Illustrated in FIG. 10, the STA11 may experience very different interference conditions. More specifically, the receiver conditions at STA11 will severely depend on what transmissions are ongoing in the overlapping BSS 1002. If STA22 is transmitting, this may not impact a transmission to STA11 at all, whereas if STA21 is transmitting a transmission to STA11 may most likely not be correctly received. If AP2 is transmitting, the outcome may in fact depend on to which STA it is transmitting. For example, if AP2 uses a directional transmission toward STA22, little interference may be experienced at STA11.

As an example, consider a DL transmission in the BSS 1001, i.e., a transmission according to the method 300 performed by the AP1 as the transmitter 100 and the STA11 performing the method 400 as the receiver 200. The experienced SINR at the STA11 embodying the receiver 200 may depend on the activities in the neighboring BSS 1002 in the following way:

SINR=25 dB, when there is no transmission in the BSS 1002
SINR=20 dB, when STA22 is transmitting
SINR=15 dB, when AP2 is transmitting to STA22
SINR=10 dB when AP2 is transmitting to STA21
SINR=10 dB when STA21 is transmitting Assuming that the AP1 embodying the transmitter 100 does not have any information about the activities in the other BSS 1002, a LA mechanism would not be able to select the best MCS for a specific transmission using a single layer. Rather the LA mechanism would converge to an MCS that gives the best average performance. Thus, one has to trade high throughput when the channels condition is good (high MCS) with a high probability of receiving the packet error free (low MCS).

A multi-layer communication according to the methods 300 and 400 may avoid or mitigate this trade-off, e.g., as a result of the higher throughput in the case of low SINR illustrated in FIG. 9. Such a case cannot be countered by feedback-based LA, if the interference occurs intermittently (i.e., is unpredictable). Furthermore, LA is not a trivial task on its own, and the discussion above highlights that even if the LA would be ideal, multi-layer transmission may still achieve a higher total throughput. The gain using multi-layer communication can be even greater in practical LA implementations, e.g., due to a time lag between the conditions indicated by a channel feedback and the current conditions. The time lag may be caused by the availability of reference signals on the channel, measurements at the receiver and the channel feedback based on the measurements.

While embodiments of the technique are illustrated in FIG. 10 for a Wi-Fi deployment, same or further embodiments are also applicable to a radio network 1000 using other radio access technologies. For example, the radio network 1000 may comprise areas of RAN coverage. The radio network 1000 may comprises a stationary RAN including at least one base station. Each base station may serve at least one cell. The base station may be an evolved Node B (eNodeB or eNB) or a Next Generation Node B (gNodeB or gNB).

For unicast and multicast transmissions of the data, a directional radio communication may be beneficial. For example, a directional transmission from the device 100 may improve the data reception at the device 200. Furthermore, a directional reception at the device 200 may improve the data reception.

Alternatively, or in addition, a directional transmission from the device 100 may reduce the interference at other radio devices that are not target radio devices of the data transmission. Furthermore, a directional reception at the device 200 may reduce the interference caused by other transmissions not targeting the device 200. The directional transmission may be implemented using an antenna array or any other multi-antenna configuration at the device 100. The directional reception may be implemented using an antenna array or any other multi-antenna configuration at the device 200.

Figure 11:
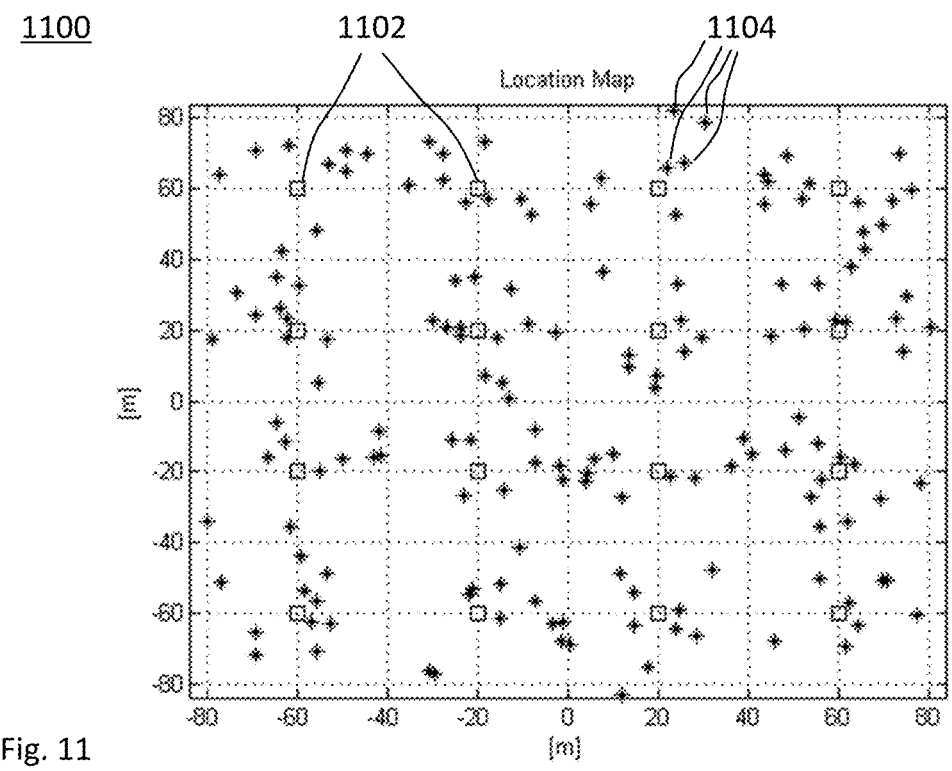
FIG. 11 schematically illustrates an exemplary radio environment comprising spatially distributed interferers.

FIG. 11 schematically illustrates an example deployment of the technique in an exemplary radio environment 1100 comprising 16 APs 1102. Each of the APs 1102 is associated with 10 STAs 1104. Any pair of the APs 1102 and the STAs 1104 may embody the transmitter 100 and the receiver 200, respectively, or vice versa.

To illustrate variations that can be experienced in such a deployment with considerable interference, one specific link or channel, i.e., a specific pair of transmitter 100 and receiver 200, was considered and the highest data rates that can be supported for individual packets were determined.

Figure 12:
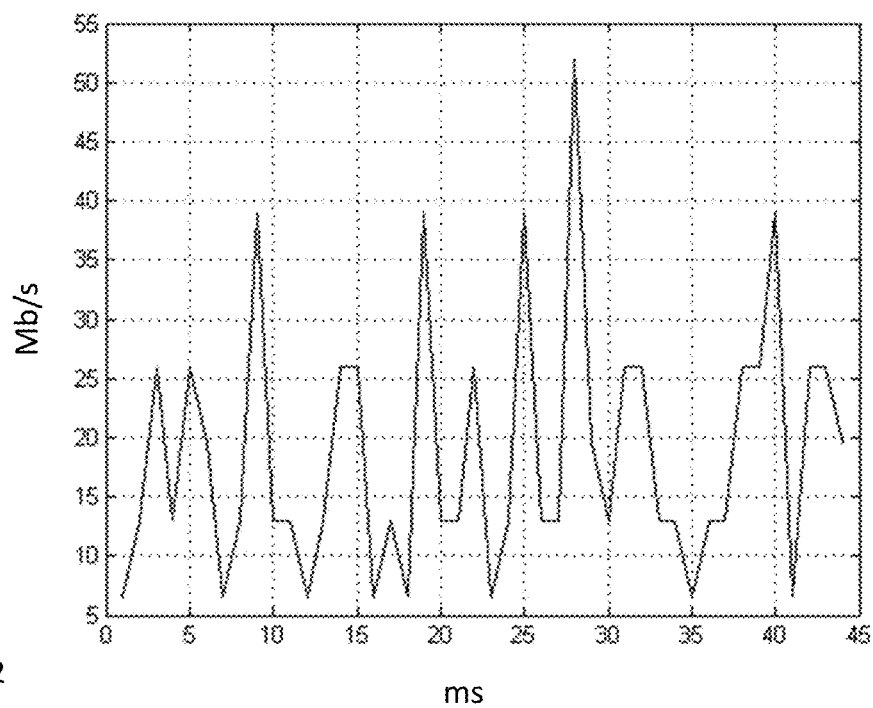
FIG. 12 schematically illustrates an example of fluctuating levels of interference resulting from a trajectory through an exemplary radio environment comprising spatially distributed interferers.

FIG. 12 shows an example how the highest data rate may vary between transmitted data packets depending on interference conditions. The data rate (in megabit per second, on the vertical axis) is plotted as a function of time (e.g., for a plurality of different instants of time on the horizontal axis). As can be observed, the highest data rate for different packets varies from 6 Mb/s (corresponding to using binary phase shift keying) to more than 50 Mb/s (corresponding to 64-QAM). The highest data rate is determined by the receiver 200 in that it is the receiver 200 that determines the number of decodable layers.

While the example radio network 1100 in FIG. 11 has been described for a Wi-Fi deployment, a similar radio environment may be deployed using a 3GPP RAN. More specifically, the radio devices 1104 may comprise 3GPP UEs in a vehicle-to-anything (V2X) radio communication, particularly a vehicle-to-vehicle (V2V) radio communication.

The illustration in FIG. 12 shows a substantial variation at the highest data rate that can be supported. While the result in FIG. 12 is based on a numerical simulation, a very similar behavior can also be seen in field measurements, which is illustrated in the following figures.

Figure 13:
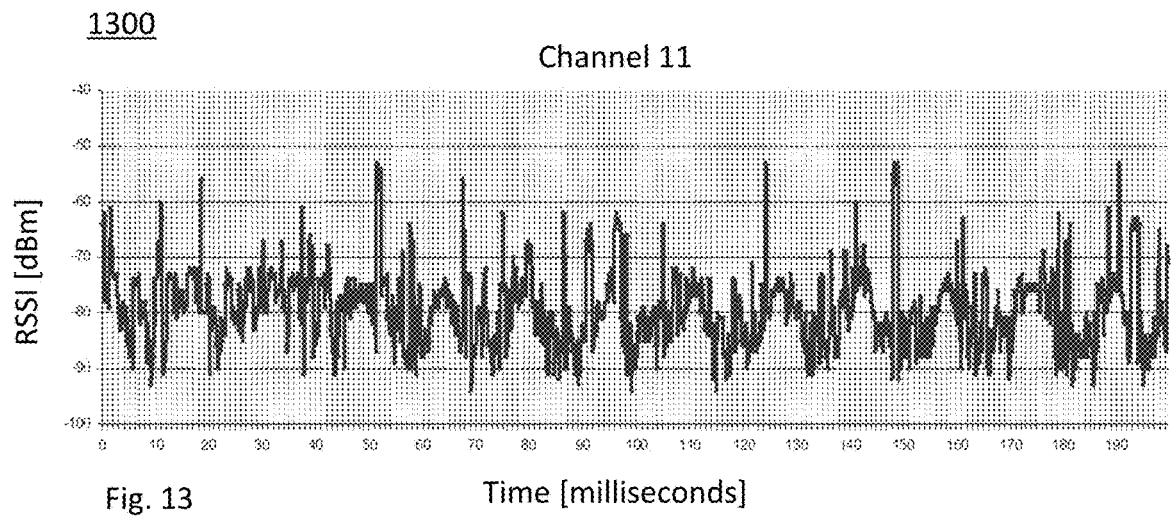
FIG. 13 schematically illustrates an example of varying levels of noise on a long time-scale.

FIG. 13 shows an example of measured power 1300 including signal, noise and interference in unlicensed 2.45 GHz band (Channel 11). That is, the entire received power is indicated on the vertical axis in terms of a Received Signal Strength Indicator (RSSI). The captured signal sample shows an interference floor which varies approximately with a 60 Hz periodicity, e.g., showing the effects that microwave oven power leakage has in a 2.45 GHz unlicensed band channel. While this interference is relatively slow with respect to a length of data packet, e.g. lengths of 4 ms according to IEEE 802.11ax, the variations are too fast for a feedback-base LA, e.g., a typical Rate Adaptation Algorithms (RAA) used by Wi-Fi APs.

Figure 14:
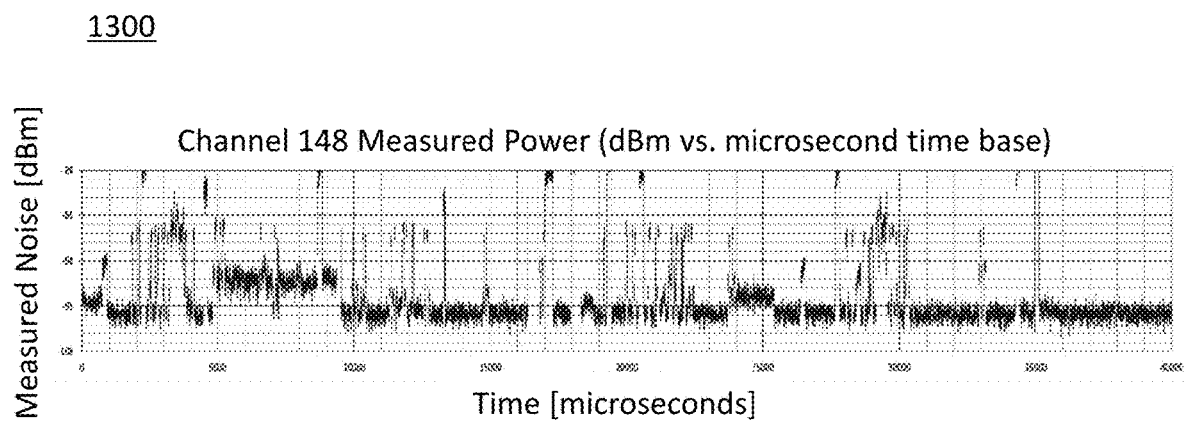
FIG. 14 schematically illustrates an example of varying levels of noise on an intermediate time-scale.

The example shown in FIG. 14 shows power 1300 measured in an unlicensed 5 GHz band (Channel 148). The measured power 1300 includes signals plus interference and noise on the 5 GHz channel in an enterprise venue. Wi-Fi 802.11 transmissions are easily visible in the measured power 1300. The interference or noise is clearly not additive white Gaussian noise (AWGN) with constant power, but is time varying.

Figure 15:
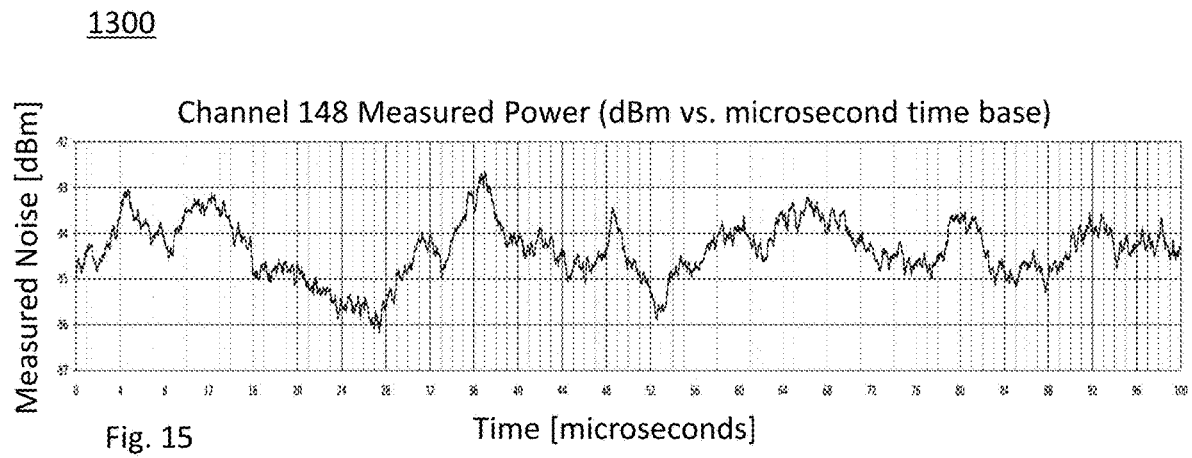
FIG. 15 schematically illustrates an example of varying levels of noise on a short time-scale.

FIG. 15 shows the measured power 1300 of FIG. 14 in an enlarged time section (i.e., "zoomed in" on the horizontal axis). The measured power 1300 includes several dB of interference floor variations. This interference is somewhat static over the duration of a few microseconds, but varies over the full range of values on the order of tens of microseconds, e.g., on the order of the duration of one modulation symbol 518.

The interference examples in FIGS. 12 to 15 show conditions under which embodiments can yield throughput gains over single-layer or non-tiered transmissions schemes. Taking Wi-Fi as example, the symbol duration according to IEEE 802.11ax is typically 13.6 µs (with a small variation depending on the added CP). While feedback-based LA cannot respond faster than the packet length, which may be 1 ms, the multi-layer communication can be robust under such rapidly varying conditions.

Figure 16:
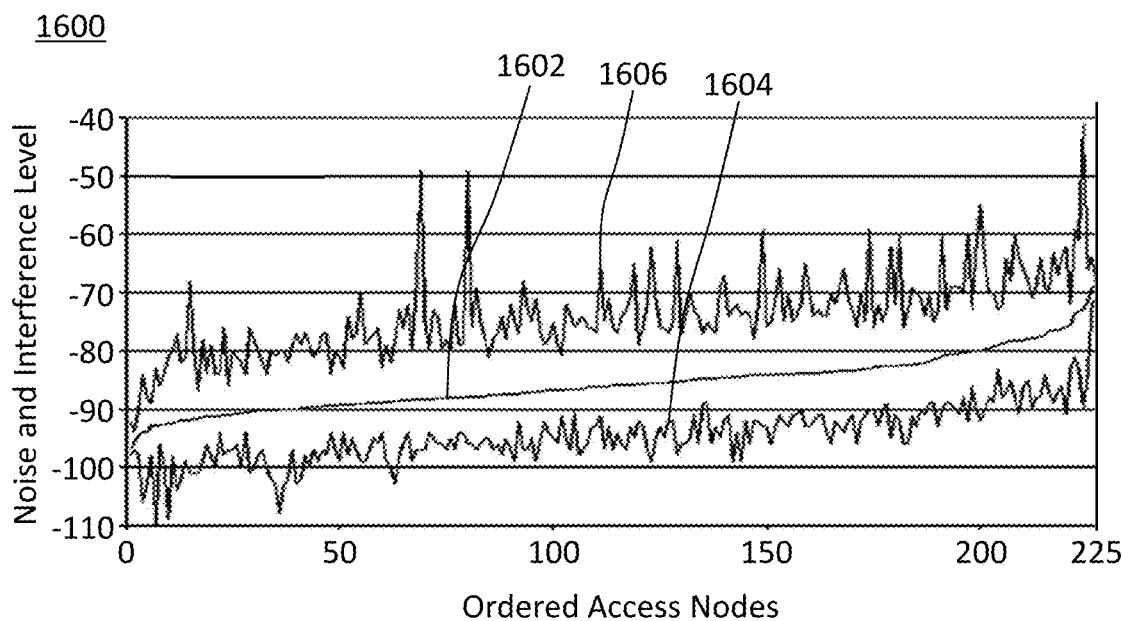
FIG. 16 schematically illustrates example measurements of mean and variance for the levels of noise and interference as quantiles in terms of nodes.
Figure 17:
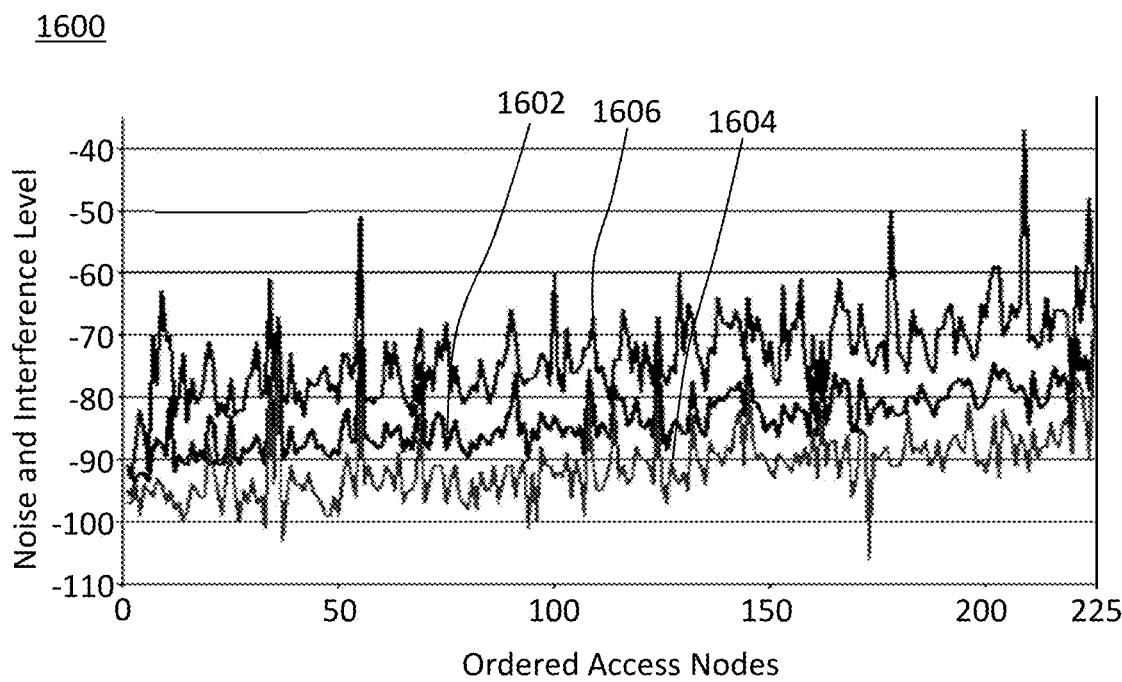
FIG. 17 schematically illustrates further examples of mean and variance for the levels of noise and interference using the order of nodes defined for FIG. 16.

Further examples for levels of interference experienced in Wi-Fi networks, e.g., in the unlicensed 2.45 GHz band, are illustrated in FIGS. 16 and 17. The plot 1600 in FIG. 16 show the sampled noise and interference floor measure at 225 Wi-Fi APs (also: Access Nodes) spread out across a city. From 9 am to 4 pm, 100 periodic samples were taken from each of the 225 Wi-Fi APs. For each AP an average 1602 of the noise and interference (middle line), a minimum 1604 of the noise and interference (lower line) and a maximum 1606 of the noise and interference (upper line) is determined. More specifically, the 225 Wi-Fi APs, as plotted in FIG. 16, are ordered from lowest to highest average 1602 of the noise and interference.

As an observational result, the Wi-Fi APs experienced noise and interference with a variation of ±10 dB. The same noise and interference data was collected the following day. Using the order for the 225 Wi-Fi APs defined for FIG. 16, the average 1602, the minimum 1604 and the maximum 1606 are plotted in the same order in FIG. 17. As an observational result, the Wi-Fi APs experienced approximately the same absolute interference and variations. This implies that unlicensed band interference tends to be location dependent, but still exhibits large ±10 dB dynamic changes in absolute interference levels.

In those locations exhibiting interference levels with significant variability, an implementation of the multi-layer communication according to the methods 300 and 400 can provide significant performance improvements. Moreover, high-capacity venues such as stadiums have similar and even more extreme variations of noise and interference and can greatly benefit from an implementation of the multi-layer communication according to the methods 300 and 400.

Any of the above embodiments for applying the multi-layer communication, e.g., to a link that (potentially) suffers from significant variations in the experienced receiver conditions, may further comprise any of the features of below implementations.

A first implementation may selectively use the multi-layer transmission. As already discussed, the gain obtained from using multi-layer transmission originates from (e.g., largely) unpredictably varying channel conditions and/or receiver conditions (collectively: conditions). When the conditions are not varying, a multi-layer transmission may still be used, but it will typically result in a performance loss compared to single-layer transmission provided a suitable MCS is found.

This property may be exploited by selectively using the multi-layer communication. As one example in accordance with the first implementation, an AP 100 may use multi-layer transmission to a set of one or more of its associated STAs at the same time as a single-layer transmission is used for another (e.g., disjoint) set of one or more of the associated STAs.

Another example of the first implementation relates to an individual link or channel. The transmitter 100 may select to change from single-layer transmission to a multi-layer transmission 306 (or vice versa) based on varying conditions. The change may in this case be initiated either by the transmitter 100 (e.g. based on difficulty in operating the LA) or it may be initiated by the receiver 200 (e.g., based on that the receiver 200 has experienced a change in the interference conditions).

Further examples of the first implementation also cover a change between single-layer transmission and multi-layer transmission based on that the link or channel is considered to change from being noise-limited to being interference-limited (or vice versa). In this case, single-layer transmission may be used when the link or channel is considered to be noise-limited, whereas multi-layer transmission 306 may be used when the link or channel is considered to be interference-limited.

Same or still further examples of the first implementation comprise selecting either the single-layer transmission or the multi-layer transmission based on the rate of the channel variations, e.g. based on a measured the Doppler shift. In this case, the multi-layer transmission 306 may be used when a Doppler shift is determined to be high, e.g., greater than a certain threshold value, whereas the single-layer transmission is used when the Doppler shift is determined to be below the same threshold value.

A second implementation may determine transmission parameters, e.g., multi-layer parameters. For a multi-layer communication, the different layers 500 are given a specific offset of the power level in order to differentiate and/or define the robustness of the respective layers 500. The choice of the power offset determines how different the robustness is for the different layers 500. For example, the larger power offset the larger the difference in robustness.

The multi-layer communication on a channel enables to effectively span the SINR range of the channel and/or the SINR range over which the receiver conditions are expected to vary. Thus, it may be desirable to select the power offset such that the range defined by the least power level and the greatest power level depends on the variation (e.g., the variance) of the conditions.

According to the second implementation applicable to any embodiment and/or the first implementation, the power offset is based at least in part on the expected variations of the conditions, e.g., such that a greater power offset is selected when the channel variation is expected (e.g., measured or reported) to be large compared to when the channel variations are expected (e.g., measured or reported) to be small.

As an example of the second implementation, a system comprising an embodiment of the transmitter 100 and an embodiment of the receiver 200 may use three layers 500. Responsive to at least one of the transmitter 100 and the receiver 200 measuring or estimating that the SINR varies within a range of about 10 dB, the power offset between two adjacent (or neighboring) layers 500 may be selected to 5 dB such that power offset between the most robust and the least robust layer 500 corresponds to the estimated channel variations.

Same or a further example of the second implementation adapts the number of used layers 500. Specifically, using a greater number of layers 500 may be triggered if at least one of the transmitter 100 and the receiver 200 measures or estimates that the channel variations are above a certain threshold value (e.g., defined in dB).

A third implementation may change the layer 500 to be used for a retransmitted part 506 of the data, e.g., for a retransmitted data packet.

Preferably, the multi-layer transmission is not used to transmit different logical streams to respectively different receivers. Rather, is the technique is beneficially applied for supporting different logical streams 506 to a certain receiver 200. The streams 506 may be equally important.

Alternatively, or in addition, the multi-layer communication is preferably not used for broadcasting applications, in which case there is no feedback channel for the receiver to request a retransmission in case the packet is not correctly received. Rather, the technique is beneficially applied for the situation that the parts 506 of the data 502 transmitted on the respective different layers 500 are acknowledged by the intended receiver 200. This may be done by transmitting a positive acknowledgment feedback (i.e., an ACK) to the transmitter 100 in case of correctly received packet and/or by transmitting a negative acknowledgment feedback (i.e., a NACK) to the transmitter 100 if the packet is not correctly received. The NACK may also be implicit, i.e., when the packet is not correctly received, the absence of an ACK will be interpreted as a NACK.

According to the third implementation, which is combinable with any embodiment and the first or second implementation, the property of different robustness for the different layers is exploited when a retransmission scheme is used. An example of such a retransmission scheme includes a simple ARQ scheme, e.g. stop-and-want ARQ, Go-back-N ARQ or selective-repeat ARQ.

For an ARQ scheme, a data packet that is not correctly received is retransmitted upon request or expiry of a timer. The retransmission scheme may also be a hybrid ARQ (HARQ) scheme, in which case the retransmission may not necessarily be identical to the first data packet transmission (but rather redundant to the first data packet transmission), and the receiver 200 combines two or more received data packets in order to extract the information. Examples of HARQ schemes include Chase Combining and Incremental Redundancy.

According to the third implementation, a data packet that is retransmitted is transmitted on a more robust layer than a data packet that is transmitted for the first time. A non-limiting specific example is described for three layers 500.

In a first instance of the transmission 306, three data packets (i.e., Packet$_1$, Packet$_2$ and Packet$_3$) are transmitted for the first time on a respective layer 500, i.e., on Layer$_1$, Layer$_2$ and Layer$_3$, respectively. Based on the one or more modulation symbols 518 of the first transmission, the partial modulation symbol 514 of the Layer$_1$ is correctly decoded at the receiver 200, whereas the partial modulation symbols 514 of the Layer$_2$ and the Layer$_3$ are in error.

In a later (e.g., the next) instance of the transmission 306, the transmitter 100 uses the Layer$_1$ and the Layer$_2$ for retransmitting the two data packets previously not correctly received at the receiver 200, whereas the Layer$_3$ is used for transmitting a new data packet. In this case, the choice of which data packet to retransmit on the Layer$_1$ and the Layer$_2$ may be arbitrary. Assuming for the purpose of explanation, in this instant of the transmission 306, only the Layer$_1$ is correctly received, whereas the Layer$_2$ and the Layer$_3$ are in error at the receiver 200.

The transmitter 100 is now faced with the situation that one data packet has failed in two transmissions (or has been retransmitted once), one data packet has failed in one transmission, and there is one new data packet for transmission to the receiver 200. In this case, the transmitter 100 transmits the data packet that has failed twice on the Layer$_1$, the data packet that has failed once on the Layer$_2$, and the new data packet on Layer$_3$.

Figure 18:
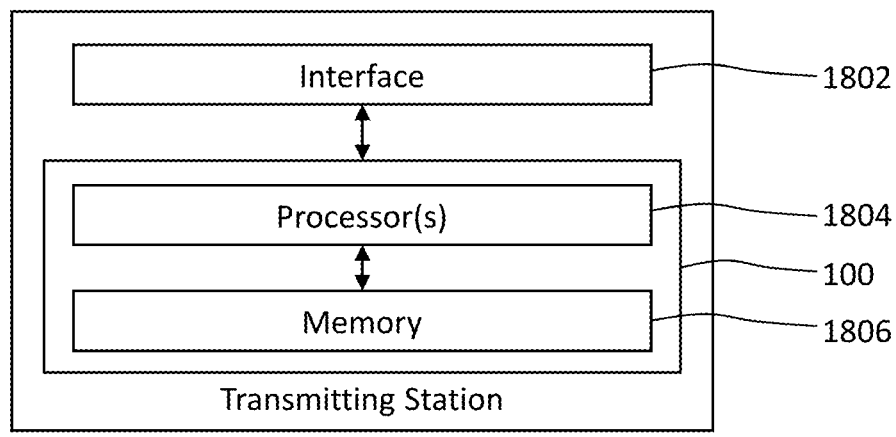
FIG. 18 shows an example schematic block diagram of a transmitting station embodying the device of FIG. 1.

FIG. 18 shows a schematic block diagram for an embodiment of the device 100. The device 100 comprises one or more processors 1804 for performing the method 300 and memory 1806 coupled to the processors 1804. For example, the memory 1806 may be encoded with instructions that implement at least one of the modules 102, 104 and 106.

The one or more processors 1804 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1806, transmitter functionality. For example, the one or more processors 1804 may execute instructions stored in the memory 1806. Such functionality may include providing various features and steps discussed herein, including any of the benefits disclosed herein. The expression "the device being operative to perform an action" may denote the device 100 being configured to perform the action.

As schematically illustrated in FIG. 18, the device 100 may be embodied by a transmitting station 1800, e.g., functioning as a transmitting base station or UE. The transmitting station device 1800 comprises a radio interface 1802 coupled to the device 100 for radio communication with one or more receiving stations, e.g., functioning as a receiving base station or UE.

Figure 19:
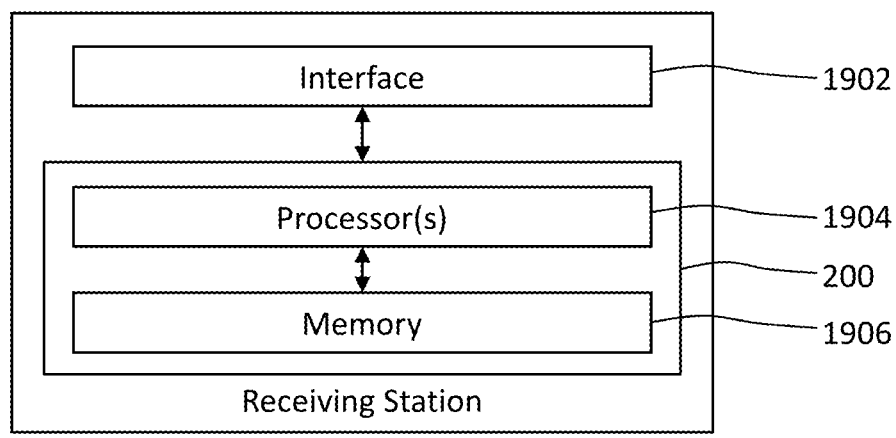
FIG. 19 shows an example schematic block diagram of a receiving station embodying the device of FIG. 2.

FIG. 19 shows a schematic block diagram for an embodiment of the device 200. The device 200 comprises one or more processors 1904 for performing the method 400 and memory 1906 coupled to the processors 1904. For example, the memory 1906 may be encoded with instructions that implement at least one of the modules 202, 204 and 206.

The one or more processors 1904 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 200, such as the memory 1906, receiver functionality. For example, the one or more processors 1904 may execute instructions stored in the memory 1906. Such functionality may include providing various features and steps discussed herein, including any of the benefits disclosed herein. The expression "the device being operative to perform an action" may denote the device 200 being configured to perform the action.

As schematically illustrated in FIG. 19, the device 200 may be embodied by a receiving device 1900, e.g., functioning as a receiving base station or UE. The receiving device 1900 comprises a radio interface 1902 coupled to the device 200 for radio communication with one or more transmitting stations, e.g., functioning as a transmitting base station or UE.

Figure 20:
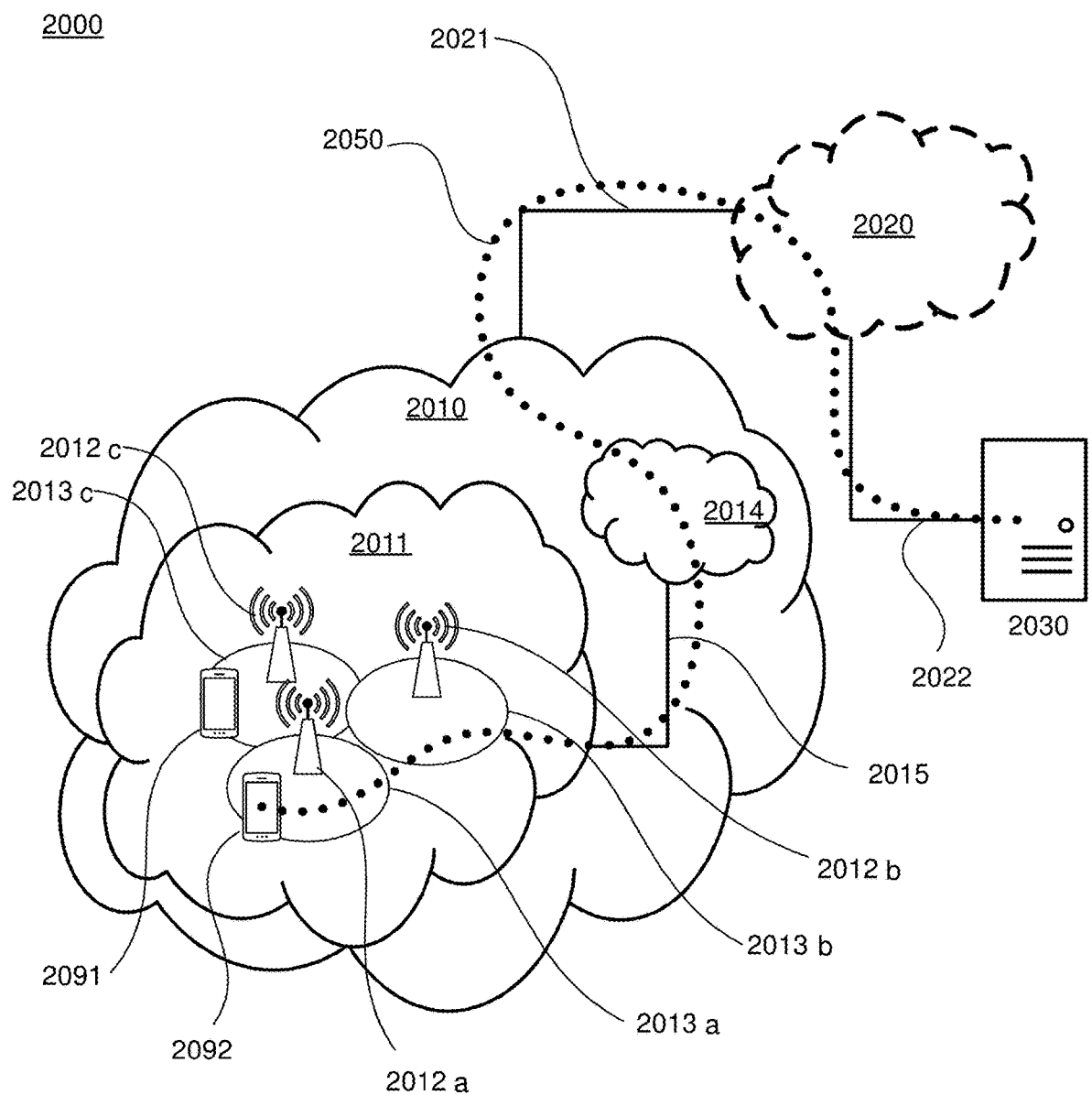
FIG. 20 schematically illustrates an example telecommunication network connected via an intermediate network to a host computer.

With reference to FIG. 20, in accordance with an embodiment, a communication system 2000 includes a telecommunication network 2010, such as a 3GPP-type cellular network, which comprises an access network 2011, such as a radio access network, and a core network 2014. The access network 2011 comprises a plurality of base stations 2012a, 2012b, 2012c, such as NBs, eNBs, gNBs or other types of wireless access points, each defining a corresponding coverage area 2013a, 2013b, 2013c. Each base station 2012a, 2012b, 2012c is connectable to the core network 2014 over a wired or wireless connection 2015. A first user equipment (UE) 2091 located in coverage area 2013c is configured to wirelessly connect to, or be paged by, the corresponding base station 2012c. A second UE 2092 in coverage area 2013a is wirelessly connectable to the corresponding base station 2012a. While a plurality of UEs 2091, 2092 are illustrated in this example, the disclosed embodiments are equally applicable to a situation where a sole UE is in the coverage area or where a sole UE is connecting to the corresponding base station 2012.

The telecommunication network 2010 is itself connected to a host computer 2030, which may be embodied in the hardware and/or software of a standalone server, a cloud-implemented server, a distributed server or as processing resources in a server farm. The host computer 2030 may be under the ownership or control of a service provider, or may be operated by the service provider or on behalf of the service provider. The connections 2021, 2022 between the telecommunication network 2010 and the host computer 2030 may extend directly from the core network 2014 to the host computer 2030 or may go via an optional intermediate network 2020. The intermediate network 2020 may be one of, or a combination of more than one of, a public, private or hosted network; the intermediate network 2020, if any, may be a backbone network or the Internet; in particular, the intermediate network 2020 may comprise two or more sub-networks (not shown).

The communication system 2000 of FIG. 20 as a whole enables connectivity between one of the connected UEs 2091, 2092 and the host computer 2030. The connectivity may be described as an over-the-top (OTT) connection 2050. The host computer 2030 and the connected UEs 2091, 2092 are configured to communicate data and/or signaling via the OTT connection 2050, using the access network 2011, the core network 2014, any intermediate network 2020 and possible further infrastructure (not shown) as intermediaries. The OTT connection 2050 may be transparent in the sense that the participating communication devices through which the OTT connection 2050 passes are unaware of routing of uplink and downlink communications. For example, a base station 2012 may not or need not be informed about the past routing of an incoming downlink communication with data originating from a host computer 2030 to be forwarded (e.g., handed over) to a connected UE 2091. Similarly, the base station 2012 need not be aware of the future routing of an outgoing uplink communication originating from the UE 2091 towards the host computer 2030.

By virtue of the method 300 and 400 being performed by any one of the UEs 2091 or 2092 and/or any one of the base stations 2012, the performance of the OTT connection 2050 can be improved, e.g., in terms of increased throughput and/or reduced latency.

Example implementations, in accordance with an embodiment, of the UE, base station and host computer discussed in the preceding paragraphs will now be described with reference to FIG. 21. In a communication system 2100, a host computer 2110 comprises hardware 2115 including a communication interface 2116 configured to set up and maintain a wired or wireless connection with an interface of a different communication device of the communication system 2100. The host computer 2110 further comprises processing circuitry 2118, which may have storage and/or processing capabilities. In particular, the processing circuitry 2118 may comprise one or more programmable processors, application-specific integrated circuits, field programmable gate arrays or combinations of these (not shown) adapted to execute instructions. The host computer 2110 further comprises software 2111, which is stored in or accessible by the host computer 2110 and executable by the processing circuitry 2118. The software 2111 includes a host application 2112. The host application 2112 may be operable to provide a service to a remote user, such as a UE 2130 connecting via an OTT connection 2150 terminating at the UE 2130 and the host computer 2110. In providing the service to the remote user, the host application 2112 may provide user data, which is transmitted using the OTT connection 2150. The user data may depend on the location of the UE 2130 determined in the step 206. The user data may comprise auxiliary information or precision advertisements (also: ads) delivered to the UE 2130. The location may be reported by the UE 2130 to the host computer, e.g., using the OTT connection 2150, and/or by the base station 2120, e.g., using a connection 2160.

The communication system 2100 further includes a base station 2120 provided in a telecommunication system and comprising hardware 2125 enabling it to communicate with the host computer 2110 and with the UE 2130. The hardware 2125 may include a communication interface 2126 for setting up and maintaining a wired or wireless connection with an interface of a different communication device of the communication system 2100, as well as a radio interface 2127 for setting up and maintaining at least a wireless connection 2170 with a UE 2130 located in a coverage area (not shown in FIG. 21) served by the base station 2120. The communication interface 2126 may be configured to facilitate a connection 2160 to the host computer 2110. The connection 2160 may be direct or it may pass through a core network (not shown in FIG. 21) of the telecommunication system and/or through one or more intermediate networks outside the telecommunication system. In the embodiment shown, the hardware 2125 of the base station 2120 further includes processing circuitry 2128, which may comprise one or more programmable processors, application-specific integrated circuits, field programmable gate arrays or combinations of these (not shown) adapted to execute instructions. The base station 2120 further has software 2121 stored internally or accessible via an external connection.

The communication system 2100 further includes the UE 2130 already referred to. Its hardware 2135 may include a radio interface 2137 configured to set up and maintain a wireless connection 2170 with a base station serving a coverage area in which the UE 2130 is currently located. The hardware 2135 of the UE 2130 further includes processing circuitry 2138, which may comprise one or more programmable processors, application-specific integrated circuits, field programmable gate arrays or combinations of these (not shown) adapted to execute instructions. The UE 2130 further comprises software 2131, which is stored in or accessible by the UE 2130 and executable by the processing circuitry 2138. The software 2131 includes a client application 2132. The client application 2132 may be operable to provide a service to a human or non-human user via the UE 2130, with the support of the host computer 2110. In the host computer 2110, an executing host application 2112 may communicate with the executing client application 2132 via the OTT connection 2150 terminating at the UE 2130 and the host computer 2110. In providing the service to the user, the client application 2132 may receive request data from the host application 2112 and provide user data in response to the request data. The OTT connection 2150 may transfer both the request data and the user data. The client application 2132 may interact with the user to generate the user data that it provides.

Figure 21:
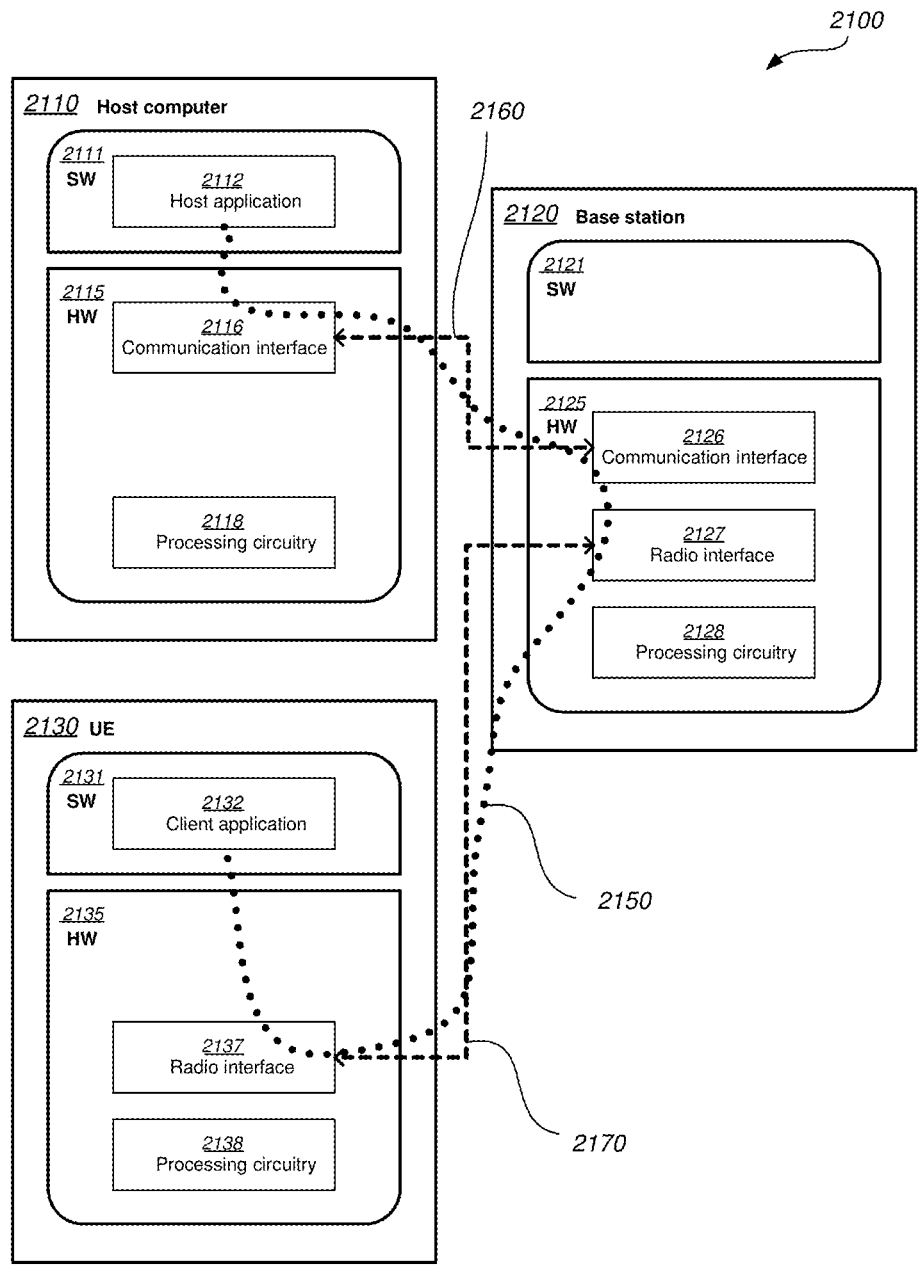
FIG. 21 shows a generalized block diagram of a host computer communicating via a base station or radio device functioning as a gateway with a user equipment over a partially wireless connection.

It is noted that the host computer 2110, base station 2120 and UE 2130 illustrated in FIG. 21 may be identical to the host computer 2030, one of the base stations 2012a, 2012b, 2012c and one of the UEs 2091, 2092 of FIG. 20, respectively. This is to say, the inner workings of these entities may be as shown in FIG. 21 and independently, the surrounding network topology may be that of FIG. 20.

In FIG. 21, the OTT connection 2150 has been drawn abstractly to illustrate the communication between the host computer 2110 and the use equipment 2130 via the base station 2120, without explicit reference to any intermediary devices and the precise routing of messages via these devices. Network infrastructure may determine the routing, which it may be configured to hide from the UE 2130 or from the service provider operating the host computer 2110, or both. While the OTT connection 2150 is active, the network infrastructure may further take decisions by which it dynamically changes the routing (e.g., on the basis of load balancing consideration or reconfiguration of the network).

The wireless connection 2170 between the UE 2130 and the base station 2120 is in accordance with the teachings of the embodiments described throughout this disclosure. One or more of the various embodiments improve the performance of OTT services provided to the UE 2130 using the OTT connection 2150, in which the wireless connection 2170 forms the last segment. More precisely, the teachings of these embodiments may reduce the latency and improve the data rate and thereby provide benefits such as better responsiveness.

A measurement procedure may be provided for the purpose of monitoring data rate, latency and other factors on which the one or more embodiments improve. There may further be an optional network functionality for reconfiguring the OTT connection 2150 between the host computer 2110 and UE 2130, in response to variations in the measurement results. The measurement procedure and/or the network functionality for reconfiguring the OTT connection 2150 may be implemented in the software 2111 of the host computer 2110 or in the software 2131 of the UE 2130, or both. In embodiments, sensors (not shown) may be deployed in or in association with communication devices through which the OTT connection 2150 passes; the sensors may participate in the measurement procedure by supplying values of the monitored quantities exemplified above, or supplying values of other physical quantities from which software 2111, 2131 may compute or estimate the monitored quantities. The reconfiguring of the OTT connection 2150 may include message format, retransmission settings, preferred routing etc.; the reconfiguring need not affect the base station 2120, and it may be unknown or imperceptible to the base station 2120. Such procedures and functionalities may be known and practiced in the art. In certain embodiments, measurements may involve proprietary UE signaling facilitating the host computer's 2110 measurements of throughput, propagation times, latency and the like. The measurements may be implemented in that the software 2111, 2131 causes messages to be transmitted, in particular empty or "dummy" messages, using the OTT connection 2150 while it monitors propagation times, errors etc.

Figures 22, 23:
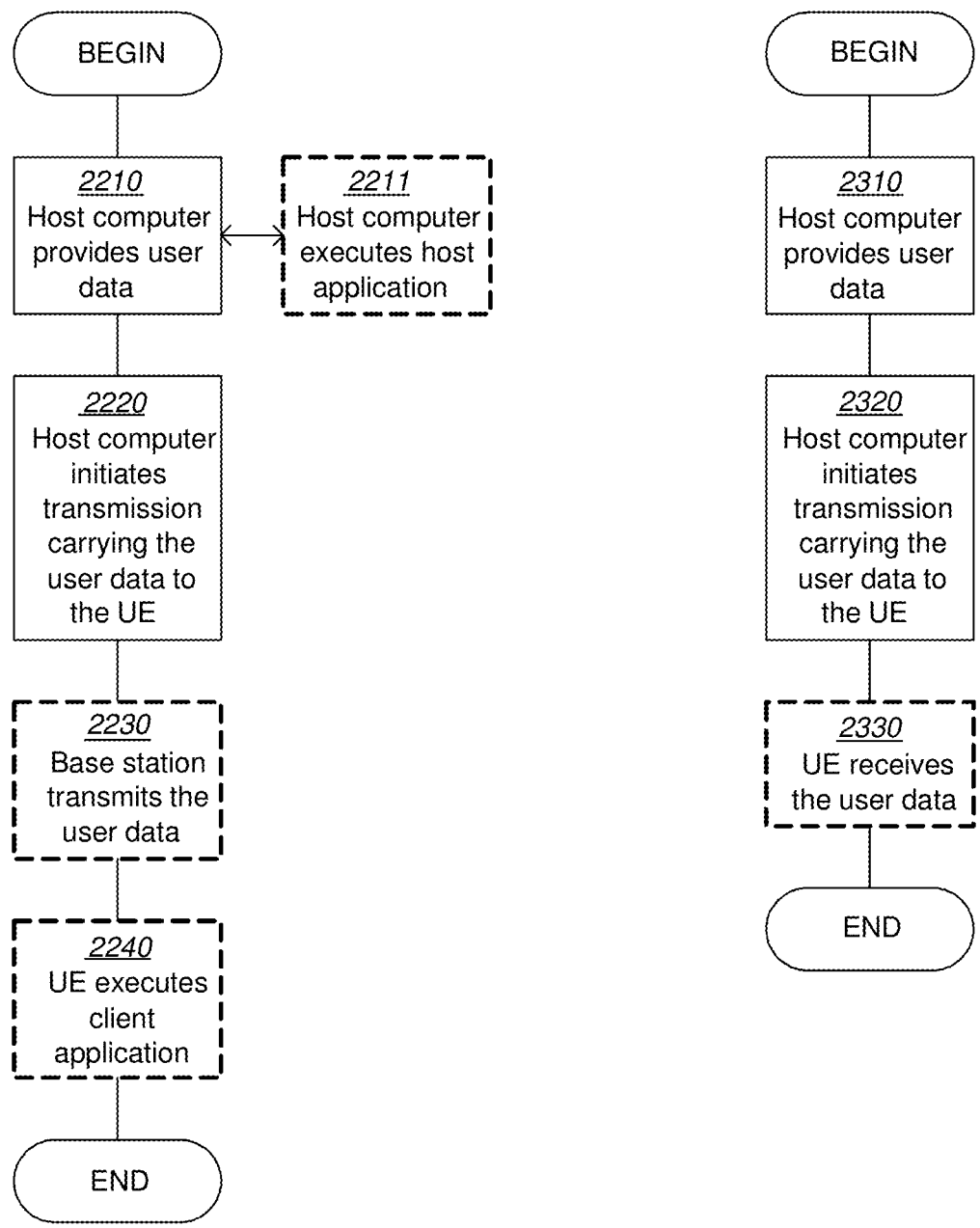
FIGS. 22 and 23 show flowcharts for methods implemented in a communication system including a host computer, a base station or radio device functioning as a gateway and a user equipment.

FIG. 22 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 22 will be included in this section. In a first step 2210 of the method, the host computer provides user data. In an optional substep 2211 of the first step 2210, the host computer provides the user data by executing a host application. In a second step 2220, the host computer initiates a transmission carrying the user data to the UE. In an optional third step 2230, the base station transmits to the UE the user data which was carried in the transmission that the host computer initiated, in accordance with the teachings of the embodiments described throughout this disclosure. In an optional fourth step 2240, the UE executes a client application associated with the host application executed by the host computer.

FIG. 23 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 23 will be included in this section. In a first step 2310 of the method, the host computer provides user data. In an optional substep (not shown) the host computer provides the user data by executing a host application. In a second step 2320, the host computer initiates a transmission carrying the user data to the UE. The transmission may pass via the base station, in accordance with the teachings of the embodiments described throughout this disclosure. In an optional third step 2330, the UE receives the user data carried in the transmission.

Any embodiment or implementation of the receiver may use a layered decoding approach, i.e., the receiver may start decoding the most robust layer and if it succeeds, this is beneficial for the other layers as the first layer is then subtracted from the received modulation symbol for the remaining layers. This procedure is then repeated iteratively for a residual modulation symbol for all remaining layers.

Moreover, the technique may be implemented as a coded system. By way of example, a data packet may comprise a plurality of (e.g., on the order of 1000) coded modulation symbols. Each modulation symbol may result from a combination of three partial modulation symbols, i.e. each having three layers. A first implementation of the decoding comprises decoding all partial modulation symbols of layer 1 of the data packet, and then subtract these and continue with the next layer. A second implementation of the decoding may decide modulation symbol by modulation symbol. For each modulation symbol of the data packet, the partial modulation symbols of layer 1 is demodulated, decoded and subtracted, and so on (based on the residual modulation symbol) for layer 2 and layer 3, before continuing to the next modulation symbol. The performance can be better in the first implementation at the cost of a longer delay, since the receiver has to effectively take decisions on all 1000 partial modulation symbols of layer 1 before starting to decode layer 2.

Furthermore, multi-layer modulation parameters may be selected. The performance of the more robust layers (e.g., layer associated with the second least power level) can become worse if additional layers are added. Thus, it may be important to not use too many layers. The technique may be implemented to control the parameters of the multi-layer modulation (particularly, the number of layers), e.g., resulting in improved reliability and/or throughput of the data transmission.

As has become apparent from above description, embodiments of the technique allow for improved spectrum efficiency and reduced delay, e.g., at a very low additional complexity. Moreover, the technique may be implemented in combination with further coexistence features such as transmission power control (TPC) and beamforming. Furthermore, the multi-layer transmission may be selectively deactivated for a given link or channel. Alternatively, or in combination, in a given radio network (e.g., within a BSS), the multi-layer transmission may be selectively used the radio communication with one or more of the radio devices and not for the radio communication with other radio devices, which may be implemented entirely transparent for legacy radio device not supporting this multi-layer transmission.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of radio receiving data, the method comprising:
    receiving a modulation symbol that is a combination of at least two partial modulation symbols at different power levels;
    demodulating, based on the received modulation symbol, a partial modulation symbol and subtracting the demodulated partial modulation symbol from the received modulation symbol resulting in a residual modulation symbol;
    repeating the demodulation based on the residual modulation symbol for demodulating-the at least two partial modulation symbols representing the data,
    wherein the demodulation is repeated in the order of decreasing power levels until the demodulation or a decoding of the demodulated partial modulation symbol fails.

2. The method of claim 1, wherein at least two of the partial modulation symbol correspond to the same modulation scheme applied at different power levels.

3. A method of radio receiving data, the method comprising:
- receiving a modulation symbol that is a combination of at least two partial modulation symbols at different power levels;
- demodulating, based on the received modulation symbol, a partial modulation symbol and subtracting the demodulated partial modulation symbol from the received modulation symbol resulting in a residual modulation symbol;
- repeating the demodulation based on the residual modulation symbol for demodulating-the at least two partial modulation symbols representing the data, further comprising or initiating:
- transmitting an acknowledgment feedback to a transmitter of the received modulation symbol, the acknowledgment feedback being indicative of a number of successfully decoded partial modulation symbols based on the received modulation symbol, the number being counted starting from the partial modulation symbol at the highest power level and in the order of decreasing power levels until the partial modulation symbol at the least power level among the successfully decoded partial modulation symbols.

4. A device for radio receiving data, the device comprising:
- at least one processor; and
- a memory coupled with said at least one processor, said memory comprising instructions executable by said at least one processor, whereby the device is operative to,
- receive a modulation symbol that is a combination of at least two partial modulation symbols at different power levels,
- demodulate, based on the received modulation symbol, a partial modulation symbol and subtracting the demodulated partial modulation symbol from the received modulation symbol resulting in a residual modulation symbol, and
- repeat the demodulation based on the residual modulation symbol for demodulating the at least two partial modulation symbols representing the data,
- wherein the demodulation is repeated in the order of decreasing power levels until the demodulation or a decoding of the demodulated partial modulation symbol fails.

5. The method of claim 1, wherein the at least two partial modulation symbols or the at least two parts of the data represented by the respective at least two partial modulation symbols are non-redundant.

6. A non-transitory computer program product comprising program code configured to perform operations of claim 1 when the computer program product is executed on one or more computing devices, the computer program product being stored on a computer-readable recording medium.

7. The device of claim 4, wherein at least two of the partial modulation symbols correspond to the same modulation scheme applied at different power levels.

8. A device for radio receiving data, the device comprising:
- at least one processor; and
- a memory coupled with said at least one processor, said memory comprising instructions executable by said at least one processor, whereby the device is operative to,
- receive a modulation symbol that is a combination of at least two partial modulation symbols at different power levels,
- demodulate, based on the received modulation symbol, a partial modulation symbol and subtracting the demodulated partial modulation symbol from the received modulation symbol resulting in a residual modulation symbol, and
- repeat the demodulation based on the residual modulation symbol for demodulating the at least two partial modulation symbols representing, the data, further comprising or initiating:
- transmitting an acknowledgment feedback to a transmitter of the received modulation symbol, the acknowledgment feedback being indicative of a number of successfully decoded partial modulation symbols based on the received modulation symbol, the number being counted starting from the partial modulation symbol at the highest power level and in the order of decreasing power levels until the partial modulation symbol at the least power level among the successfully decoded partial modulation symbols.

9. The device of claim 4, wherein the at least two partial modulation symbols or the at least two parts of the data represented by the respective at least two partial modulation symbols are non-redundant.

* * * * *